(12) United States Patent
Valdes Lopez et al.

(10) Patent No.: US 9,454,810 B2
(45) Date of Patent: Sep. 27, 2016

(54) CORRECTING CHROMINANCE VALUES BASED ONTONE-MAPPED LUMINANCE VALUES

(71) Applicant: Imagination Technologies Limited, Kings Langley (GB)

(72) Inventors: Victor Valdes Lopez, Hemel Hempstead (GB); Michael Bishop, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 66 days.

(21) Appl. No.: 14/513,831

(22) Filed: Oct. 14, 2014

(65) Prior Publication Data
US 2015/0110399 A1    Apr. 23, 2015

(30) Foreign Application Priority Data

Oct. 17, 2013   (GB) .................................. 1318410.6

(51) Int. Cl.
*G06K 9/00*   (2006.01)
*G06T 5/00*   (2006.01)
(Continued)

(52) U.S. Cl.
CPC .............. *G06T 5/009* (2013.01); *G06T 5/001* (2013.01); *G06T 5/007* (2013.01); *G06T 5/20* (2013.01); *G06T 5/40* (2013.01); *H04N 1/4074* (2013.01); *H04N 1/6005* (2013.01); *H04N 5/2351* (2013.01); *H04N 5/243* (2013.01); *H04N 9/646* (2013.01); *H04N 9/68* (2013.01); *G06T 2207/20012* (2013.01); *G06T 2207/20021* (2013.01)

(58) Field of Classification Search
CPC ......... G06T 5/00; G06T 5/001; G06T 5/002; G06T 5/007; G06T 5/008; G06T 5/009; G06T 5/20; G06T 5/40; G06T 5/50; G06T 2207/10016; G06T 2207/10024; G06T 2207/10056; G06T 2207/10068; G06T 2207/10144; G06T 2207/10152; G06T 2207/20004; G06T 2207/20012; G06T 2207/20021; G06T 2207/20192; G06T 2207/20208; G06T 2207/20221; G06T 2207/30004; H04N 1/4074; H04N 1/4092; H04N 1/58; H04N 1/6005; H04N 1/6027; H04N 5/2256; H04N 5/2351; H04N 5/2355; H04N 5/243; H04N 9/643; H04N 9/646; H04N 9/68; H04N 19/136; H04N 19/186; H04N 19/44; H04N 19/61; H04N 19/65; G02B 21/367
See application file for complete search history.

(56) References Cited

U.S. PATENT DOCUMENTS 8,472,748 B2 *  6/2013  Jang ..................... H04N 1/4092
                                                         358/3.26
8,687,087 B2 *  4/2014  Pertsel ................. H04N 5/2351
                                                         348/229.1
(Continued)

*Primary Examiner* — Jose Couso
(74) *Attorney, Agent, or Firm* — Vorys, Sater, Seymour and Pease LLP; Vincent M DeLuca

(57) ABSTRACT

A tone mapping unit applies tone mapping to a block of pixel values. In each of a plurality of iterations, one or more lines of pixel values are processed based on information relating to pixel values of at least one previous line of the block which have been processed in at least one previous iteration. The information is used to determine one or more tone mapping relationships which is/are used to map the pixel values of the current line to tone-mapped pixel values. Furthermore, the information is updated based on the pixel values of the current line and stored for use in processing pixel values of a subsequent line of pixel values of the block in a subsequent iteration.

13 Claims, 14 Drawing Sheets

(51) Int. Cl.
*G06T 5/40* (2006.01)
*G06T 5/20* (2006.01)
*H04N 9/64* (2006.01)
*H04N 1/407* (2006.01)
*H04N 5/235* (2006.01)
*H04N 9/68* (2006.01)
*H04N 5/243* (2006.01)
*H04N 1/60* (2006.01)

(56) References Cited

U.S. PATENT DOCUMENTS

| | | |
|---|---|---|
| 2009/0067713 A1 | 3/2009 | Chen et al. |
| 2010/0157078 A1 | 6/2010 | Atanassov et al. |
| 2012/0201453 A1 | 8/2012 | Furuya |
| 2014/0240533 A1* | 8/2014 | Hirooka ............... H04N 9/643 348/223.1 |

* cited by examiner

CORRECTING CHROMINANCE VALUES BASED ON TONE-MAPPED LUMINANCE VALUES

BACKGROUND

Tone mapping is a technique used in image processing and computer graphics processing to map one set of pixel values (e.g. luminance and/or chrominance values) to another set of pixel values in order to give the impression of a higher dynamic range than is actually available. A range of pixel values of an original image are mapped to a different range of tone-mapped pixel values to achieve a "better" appearance for the image, which for example may be better in the sense that the contrast is enhanced, the detail in the image is improved, or the dynamic range is increased, etc.

One approach for applying tone mapping is to calculate a global tone mapping curve for an image which defines the correspondence between the input and output pixel intensity levels for all of the pixels in the image. As an example, where the tone mapping is to be applied to images captured by a camera, the global tone mapping curve may be fixed once a particular camera mode has been set, and typically would not be updated during the processing a sequence of images (e.g. when recording video). The technique for extracting the global tone mapping curve may be different in different systems but the underlying aim of the global tone mapping is to assign a bigger range of output pixel values to the most frequently occurring pixel values of the original image.

FIG. 1 shows an example system of applying global tone mapping to an original image 102, which comprises original luminance values 104 and original chrominance values 106, to thereby determine a tone mapped image 108 which comprises tone-mapped luminance values 110 and corrected chrominance values 112. A histogram 114 of the luminance values is determined. The histogram shows the distribution of the luminance values across the range of available luminance values (e.g. from 0 to 255 where the luminance values each comprise 8 bits). The histogram 114 is used to determine a tone mapping curve 116 which describes a suitable tone-mapping for mapping the luminance values of the image to tone-mapped luminance values. The tone mapping curve 116 has the original luminance values along the x-axis and the tone-mapped luminance values on the y-axis. The tone-mapping curve 116 may for example be determined by integrating the histogram 114. A mapping module 118 then uses the tone mapping curve 116 to map the original luminance values 104 to the tone-mapped luminance values 110. A chrominance processing module 120 uses the tone-mapped luminance values 110 to correct the original chrominance values 106 to thereby determine the corrected chrominance values 112 of the tone-mapped image 108.

The application of a single, global tone mapping curve for the whole image as described above may provide a general appearance improvement but all the pixels of the image with the same pixel value have to be mapped to the same output value, regardless of the pixel values of the surrounding area. Therefore, the use of a global mapping curve is a limited solution in terms of local enhancement of image areas with specific characteristics.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A tone mapping unit applies tone mapping to a block of pixel values. In each of a plurality of iterations, one or more lines of pixel values are processed based on information relating to pixel values of at least one previous line of the block which have been processed in at least one previous iteration. The information is used to determine one or more tone mapping relationships which is/are used to map the pixel values of the current line to tone-mapped pixel values. Furthermore, the information is updated based on the pixel values of the current line and stored for use in processing pixel values of a subsequent line of pixel values of the block in a subsequent iteration.

There is provided a method of applying tone mapping to a block of pixel values comprising a plurality of lines of pixel values, the method comprising, in each of a plurality of iterations: receiving a current line of pixel values of the block; retrieving stored information relating to pixel values of at least one previous line of the block which have been processed in at least one previous iteration; using the retrieved information to: (i) determine updated information which is updated in dependence on the pixel values of the current line, and (ii) determine one or more tone mapping relationships for use in mapping the pixel values of the current line to tone-mapped pixel values; mapping the pixel values of the current line to tone-mapped pixel values using the determined one or more tone mapping relationships; and storing the updated information for use in processing pixel values of a subsequent line of pixel values of the block in a subsequent iteration.

There is also provided a method of correcting input chrominance values of pixels to determine corrected chrominance values for the pixels based on tone-mapped luminance values which have been determined by applying tone mapping to input luminance values of the pixels, the method comprising: determining candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value; determining confidence weightings which indicate confidences in the respective candidate corrected chrominance values, wherein the confidence weightings are determined in dependence on the input luminance values of the respective pixels; and using the determined confidence weightings to perform, for each of the pixels, a weighted combination of the respective candidate corrected chrominance value and the respective input chrominance value, thereby determining the corrected chrominance values for the pixels.

There is also provided a tone mapping unit configured to apply tone mapping to a block of pixel values comprising a plurality of lines of pixel values, the tone mapping unit comprising a processing module configured to, in each of a plurality of iterations: receive a current line of pixel values of the block; retrieve stored information relating to pixel values of at least one previous line of the block which have been processed in at least one previous iteration; use the retrieved information to: (i) determine updated information which is updated in dependence on the pixel values of the current line, and (ii) determine one or more tone mapping relationships for use in mapping the pixel values of the current line to tone-mapped pixel values; map the pixel values of the current line to tone-mapped pixel values using the determined one or more tone mapping relationships; and cause the updated information to be stored for use in processing pixel values of a subsequent line of pixel values of the block in a subsequent iteration.

There is also provided a chrominance processing module configured to correct input chrominance values of pixels to determine corrected chrominance values for the pixels based on tone-mapped luminance values which have been determined by applying tone mapping to input luminance values of the pixels, the chrominance processing module being configured to: determine candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value; determine confidence weightings in dependence on the input luminance values of the respective pixels, the confidence weightings indicating confidences in the respective candidate corrected chrominance values; and use the determined confidence weightings to perform, for each of the pixels, a weighted combination of the respective candidate corrected chrominance value and the respective input chrominance value, to thereby determine the corrected chrominance values for the pixels.

There is also provided computer readable code, and a computer readable storage medium having encoded thereon computer readable code, adapted to perform the steps of any of the methods described herein when the code is run on a computer. The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
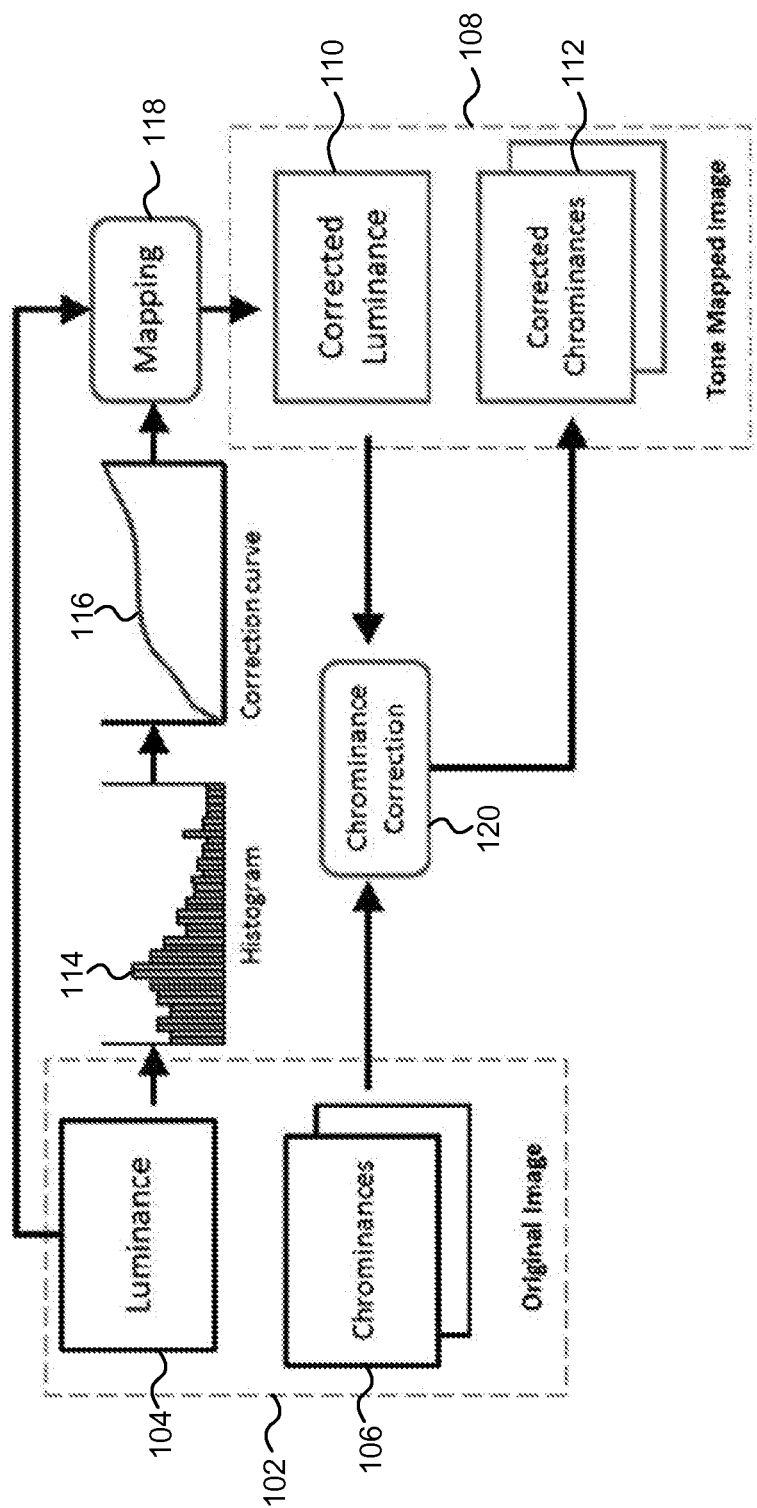
FIG. 1 represents a conventional system for applying global tone mapping to an original image.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Figure 2:
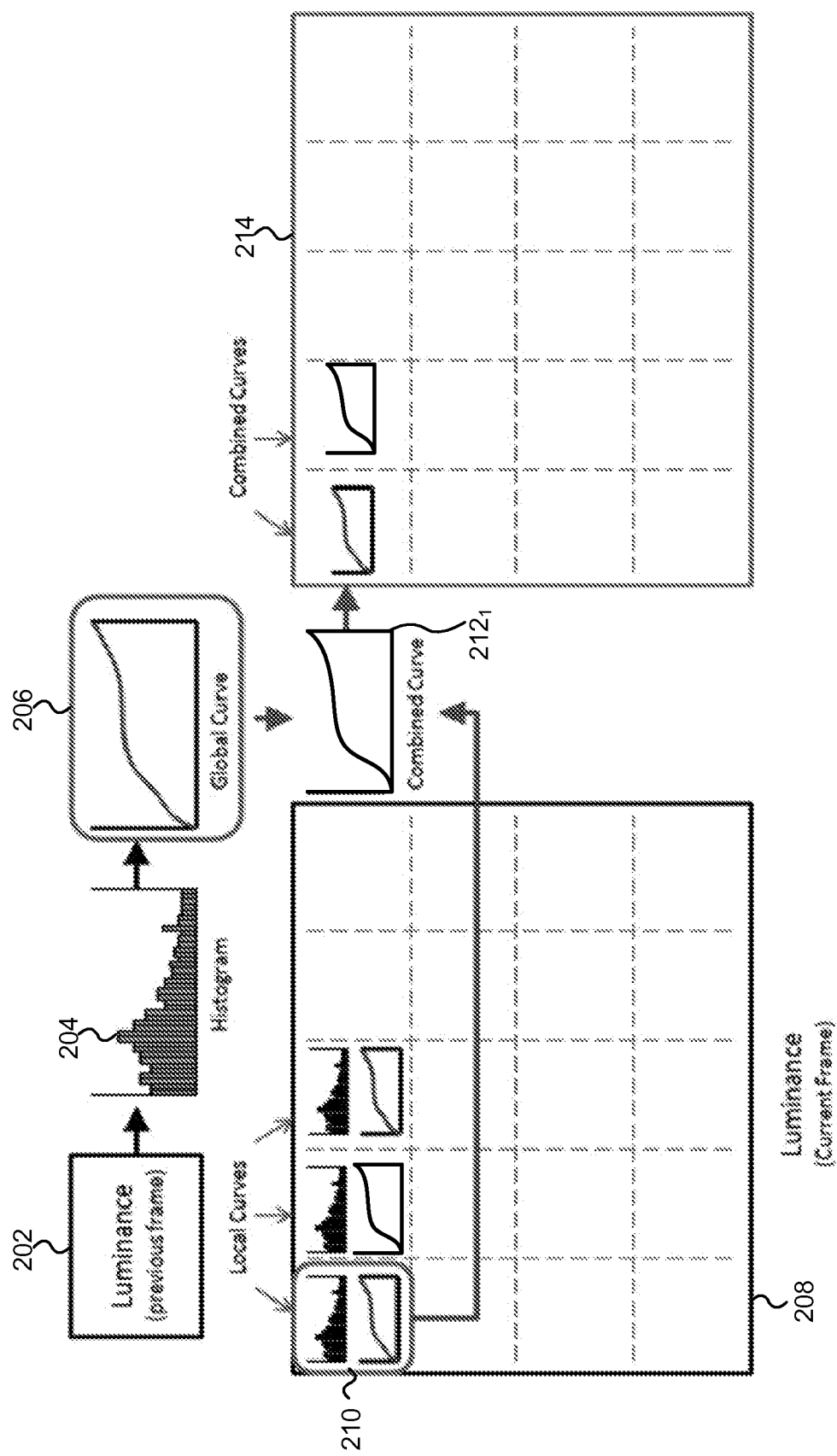
FIG. 2 represents a system for determining local tone mapping curves.

In contrast to the system shown in FIG. 1 which uses a global tone mapping curve for mapping all of the luminance values to tone-mapped luminance values, a block of pixel values (representing an image) may be divided into a plurality of sub-blocks, wherein each sub-block can be analysed to determine a respective histogram and local tone mapping curve for the sub-block. Such a system is represented in FIG. 2 in an example in which the images are frames of a sequence of frames (e.g. frames of a video sequence). As shown in FIG. 2, the luminance values 202 of the whole of the previous frame are used to determine a histogram 204 which is then used to determine a global tone mapping curve 206, in a corresponding way to that shown in FIG. 1. However, FIG. 2 also shows the luminance values of the current frame 208, and it can be seen in FIG. 2 that the current frame 208 is divided into a plurality of sub-blocks (indicated by the dashed lines in FIG. 2). In the example shown in FIG. 2 the image 208 is divided into a 5×4 array of sub-blocks. For each sub-block of the image 208 a histogram representing the distribution of pixel values in the sub-block is determined and then used to determine a local tone mapping curve for the sub-block. For clarity, FIG. 2 shows the histogram and local tone mapping curves (denoted 210 for the top left sub-block of the image 208) for only three of the sub-blocks of the image 208, but respective histograms and local tone mapping curves will be determined for each of the sub-blocks in the image 208. For each of the sub-blocks the local tone mapping curve is combined with the global tone mapping curve 206 to determine a respective tone mapping curve, e.g. to determine the combined curve $212_1$ for the top left sub-block. An array 214 of the combined curves for the sub-blocks is determined.

Figure 3:
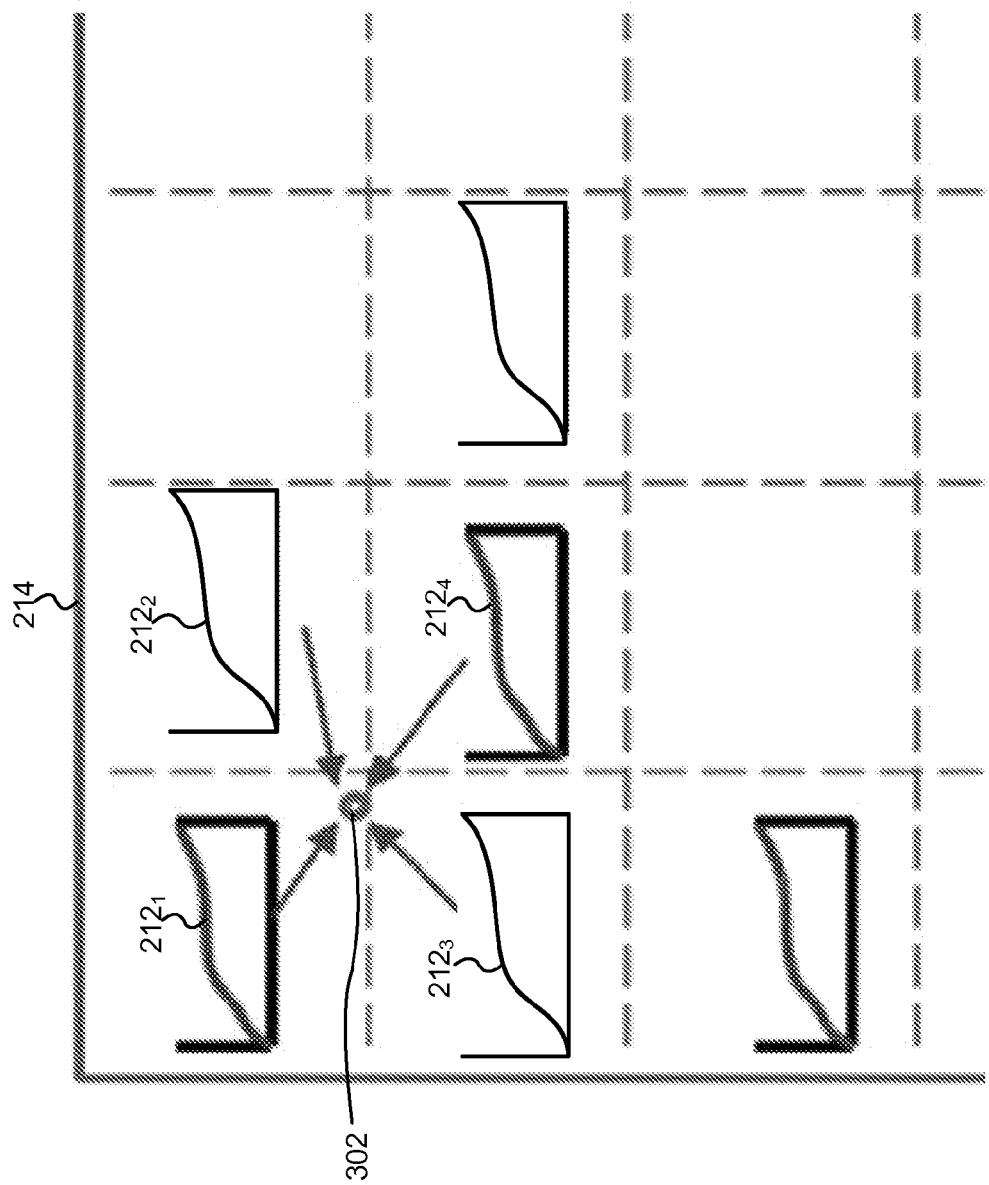
FIG. 3 represents applying local tone mapping curves to determine a tone-mapped pixel value.

FIG. 3 shows how the tone mapping curves 212 for the sub-blocks in the block 214 can be used to determine a tone-mapped pixel value for a pixel 302. The four sub-blocks that are closest to the pixel 302 have respective tone mapping curves $212_1$, $212_2$, $212_3$ and $212_4$. The tone-mapped value for pixel 302 can be determined by determining respective tone-mapped pixel values for the pixel using the different tone mapping curves $212_1$, $212_2$, $212_3$ and $212_4$, and then performing a two-dimensional interpolation of the four different tone-mapped pixel values according to the position of the pixel 302.

The system described with reference to FIGS. 2 and 3 which uses local tone mapping curves overcomes the issues mentioned above in relation to the use of a global tone mapping curve (as described with reference to FIG. 1) in that the local tone mapping curves allow different mappings to be applied in different regions of the image, thereby allowing local enhancement of image areas with specific characteristics. The system described with reference to FIGS. 2 and 3 is well-suited for being implemented in software which can randomly access different regions of the image, e.g. to determine all of the pixel values of a particular sub-block for use in determining the histogram and local tone mapping curve for a particular sub-block.

However, it may be problematic to implement the local tone mapping system described with reference to FIGS. 2 and 3 if random access to different parts of the image is not available. For example, if the tone mapping is applied in a hardware block of a camera pipeline which processes lines of pixel data as they are received from an image sensor, then random access to different regions of the image may not be available to the hardware block when the tone mapping is applied.

Embodiments will now be described by way of example only which can be used to apply local tone mapping to images even if random access to different regions of an image is not available.

Figure 4:
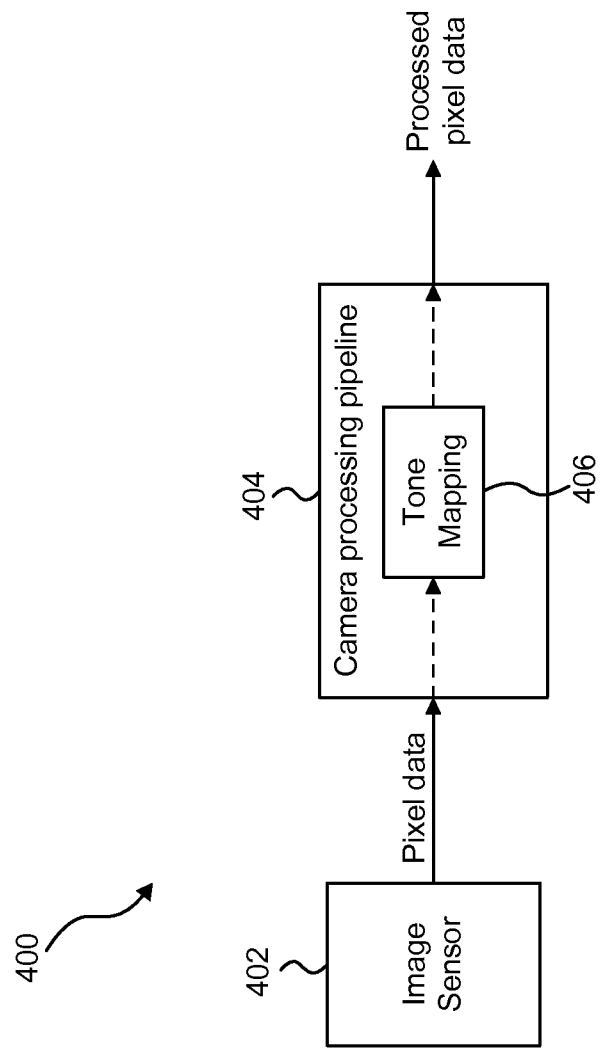
FIG. 4 is a schematic diagram of an image processing system.

FIG. 4 shows an image processing system 400 which includes an image sensor 402 and a camera processing pipeline 404. The image processing system 400 may be implemented in a device, such as a camera. The image sensor 402 is configured to capture image data and provide pixel data relating to an array of pixels representing an image to the camera processing pipeline 404. The image sensor 402 may capture a sequence of images, which can then be used to represent frames of a video sequence. The pixel data may be in one of many different possible formats, for example the data for a pixel may comprise Red, Green and Blue (RGB) values to represent the intensity of the respective three colour channels at the pixel position. Alternatively, the data for a pixel may comprise a luminance value (e.g. denoted "Y") and one or more chrominance values (e.g. denoted "U" and "V" or denoted "$C_r$" and "$C_b$"). The camera processing pipeline 404 comprises a number of processing units for applying processing to the pixel data, including a tone mapping unit 406. Processed pixel data is output from the camera processing pipeline 404, and may be used in any suitable manner, e.g. output to a display, stored in memory, etc. The tone mapping unit 406 is configured to process pixel data which is in a format comprising luminance and chrominance values, so if the pixel data received at the camera processing pipeline 404 is not in a format comprising luminance and chrominance values then the camera processing pipeline 404 will comprise a conversion unit for converting the format of the pixel data into luminance and chrominance values before the pixel data is processed by the tone mapping unit 406.

Pixel values relating to lines of pixels are processed in the camera processing pipeline 404 as they are received from the image sensor 402, e.g. in raster scan order, line by line. As described in more detail below, the camera processing pipeline 404 may process multiple lines of pixel data at a time, in parallel.

Figure 5:
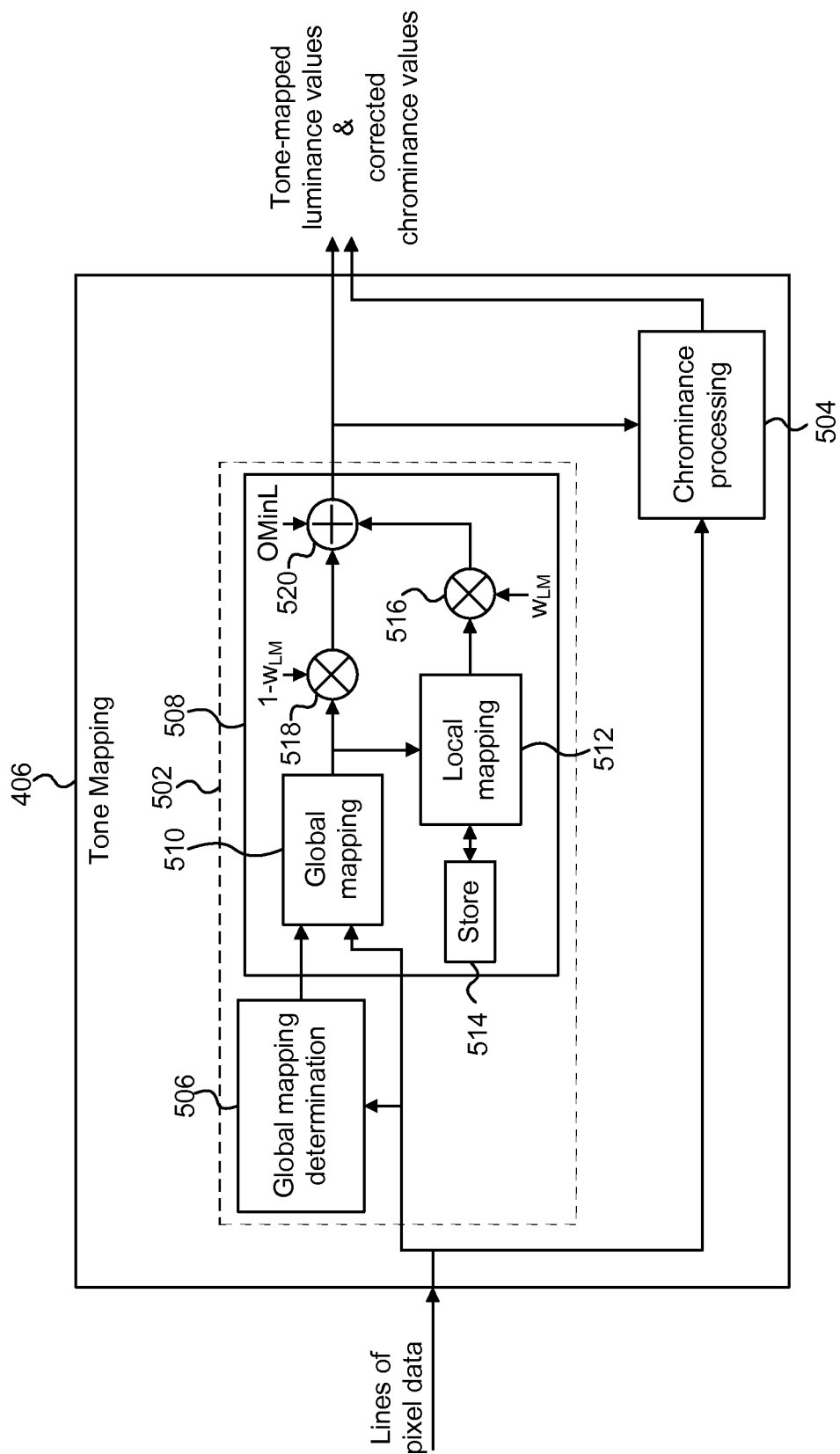
FIG. 5 is a schematic diagram of a tone mapping unit.

FIG. 5 shows a schematic diagram of the tone mapping unit 406 which is configured to receive lines of pixel data. As described above, the pixel data received at the tone mapping unit 406 includes input luminance values and input chrominance values for the pixels. The tone mapping unit 406 comprises a luminance processing module 502 which is configured to determine tone-mapped luminance values. The tone mapping unit 406 also comprises a chrominance processing module 504 which is configured to determine corrected chrominance values based on the tone mapping that has been applied to the luminance values. The luminance processing module 502 comprises a global mapping determination module 506 and a processing module 508. The processing module 508 comprises a global mapping module 510, a local mapping module 512, a store 514, a first multiplier 516, a second multiplier 518 and an adder 520.

The chrominance processing module 504, the global mapping determining module 506 and the processing module 508 (in particular the global mapping module 510) are arranged to receive the lines of input pixel values. It may be the case that only the luminance values of the received lines of pixel data are provided to the modules of the luminance processing module 502, but the luminance values and the chrominance values of the received lines of pixel data are provided to the chrominance processing module 504. An output of the global mapping determination module 506 is coupled to an input of the global mapping module 510. An output of the global mapping module 510 is coupled to respective inputs of the local mapping module 512 and the multiplier 518. The local mapping module 512 is coupled to the store 514. An output of the local mapping module 512 is coupled to an input of the multiplier 516. An output of the multiplier 518 is coupled to a first input of the adder 520. An output of the multiplier 516 is coupled to a second input of the adder 520. An output of the adder 520 is coupled to an input of the chrominance processing module 504 and is provided as an output of the tone mapping unit 406 to provide tone-mapped luminance values. An output of the chrominance processing module 504 is provided as an output of the tone mapping unit 406 to provide corrected chrominance values. It is noted that the store 514 is shown in FIG. 5 as being located in the processing module 508, but in other examples, the store 514 may be implemented outside the processing module 508 and/or outside the luminance processing module 502 and/or outside the tone mapping unit 406. In examples described in detail herein, the modules within the processing module 508 and the chrominance processing module 504 are implemented in hardware whilst the global mapping determination module 506 is implemented in software. However, more generally, the modules of the tone mapping unit 406 may be implemented in hardware, software or a combination thereof.

Since the pixel data is received at the tone mapping unit 406 in raster scan order (i.e. in lines of pixel values), it might not be possible to apply the local tone mapping as described above in relation to FIGS. 2 and 3. In a simple example, the tone mapping unit 406 processes one line of pixel values at a time and then iterates the method to process other lines of pixel values (although in more complex examples multiple lines of pixel values can be processed in parallel in each iteration, as described in more detail below). To reduce the amount data storage used by the tone mapping unit 406, pixel values of previously processed lines are not stored in the tone mapping unit 406. Furthermore, when the tone mapping unit 406 is processing a current line of pixel values, the pixel values for subsequent lines (i.e. not yet processed lines) of the image are not known at the tone mapping unit 406.

Therefore, rather than determining local tone mapping curves for sub-blocks as described in relation FIGS. 2 and 3, the tone mapping unit 406 uses the idea of "rolling information", which may be a rolling histogram or a rolling tone mapping curve, to approximate the local tone mapping curve mechanism by storing only a small amount of information (i.e. substantially less information than storing the pixel values themselves) relating to the pixel values of the previously processed lines. In an example, the block of pixel values representing the image is divided in a predefined number of columns and one histogram is calculated per column as each row of pixel values is processed. In this example, for each new line (i.e. row) the histograms for the pixel columns are each updated as a weighted combination of the previous histogram values and the histogram values corresponding to the new line. Tone mapping curves can be derived from the resulting histograms for each new line. In this way the tone mapping unit 406 can process each line of pixel values as it is received based on information relating to pixel values of previous lines. The updated information is stored for use in processing subsequent lines.

Figure 6:
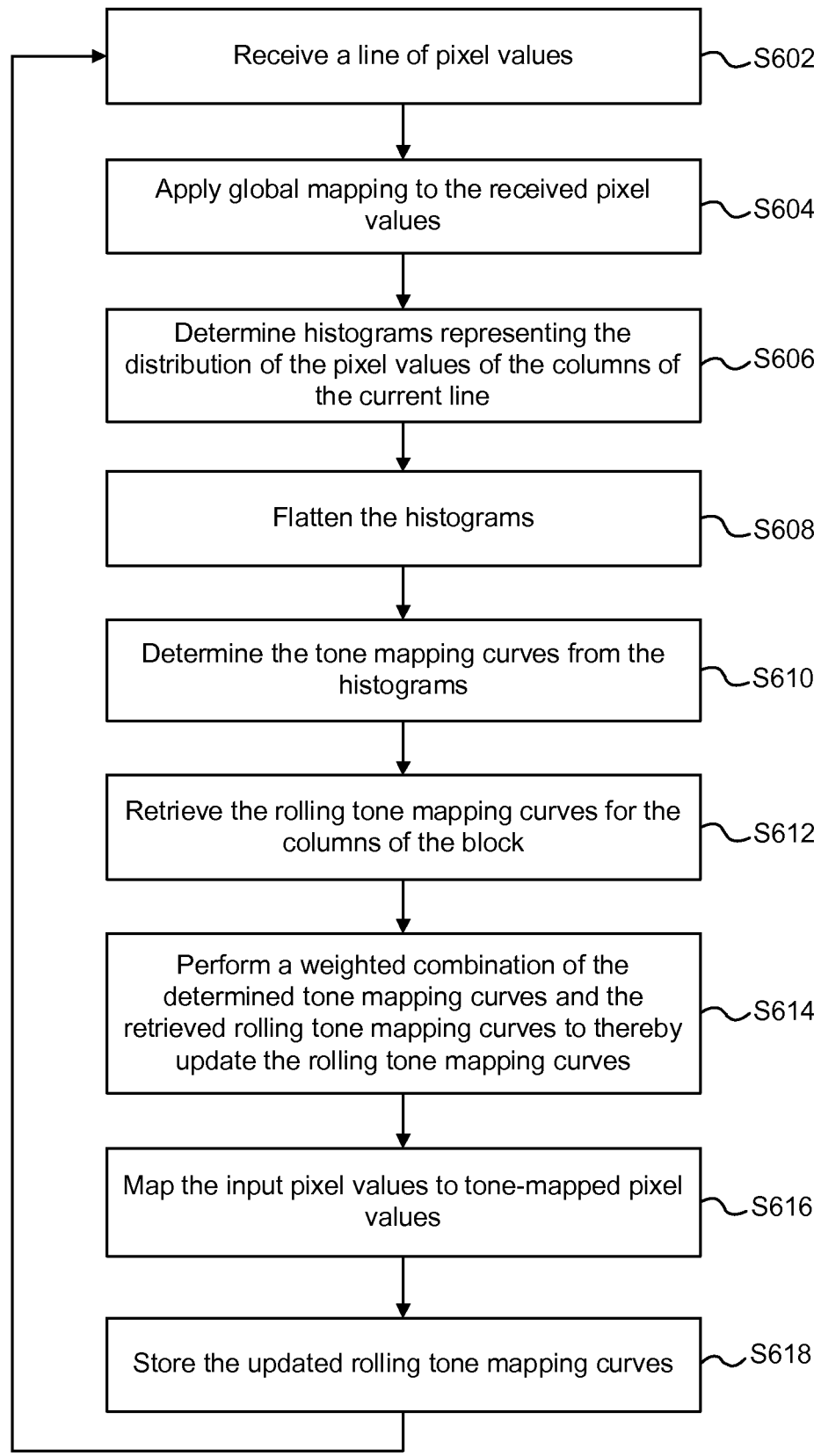
FIG. 6 is a flow chart for a method of applying tone mapping to a block of pixel values.

The luminance values of the input pixel data are processed in the luminance processing module 502 to determine tone-mapped luminance values (e.g. independently of the input chrominance values). The operation of the luminance processing module 502 is described with reference to the flow chart shown in FIG. 6. As previously explained the method steps shown in FIG. 6 are applied for each received line of pixel values.

In an example described in detail herein the input pixel data received at the tone mapping unit 406 relates to a sequence of frames (e.g. of a video sequence). The global mapping determination module 506 uses the pixel values of a frame to determine a global mapping curve in a corresponding manner to that described above in relation to FIG. 1. The global mapping curve is determined after all of the pixel values of the frame have been received at the tone mapping unit 406. Therefore, as the pixel values of a current frame are received at the tone mapping unit 406, the global mapping determination module 506 can determine a global mapping curve based on the pixel values of a previous frame (e.g. the immediately preceding frame of the sequence of frames). It is assumed that the distribution of pixel values for the current frame will be sufficiently similar to the distribution of pixel values of the previous frame (e.g. the immediately preceding frame) such that the global mapping curve determined based on the pixel values of the previous frame will be suitable for use in processing the pixel values of the current frame. The global mapping curve determined by the global mapping determination module 506 is provided to the global mapping module 510. In other examples, the global mapping curve may be pre-tuned for a particular sensor or for a particular camera scene mode, in which case the global mapping determination module 506 would not receive the pixel data and would not determine the global mapping curve based on pixel data of a previous frame. In this way the global mapping curve may be fixed to predefined values. In other examples, a global mapping curve might not be used at all, but usually the use of a global mapping curve provides better results in the final tone-mapped pixel values.

In step S602 a line of pixel values is received at the processing module 508. In particular the line of pixel values is received at the global mapping module 510. As will be appreciated, the method shown in FIG. 6 is iterated for a plurality of lines of a block of pixel values representing an image. The line of pixel values that is being processed in a current iteration may be referred to as the "current line" of pixel values. As described above, the pixel values which are processed in the luminance processing module 502 are luminance values.

In step S604 the global mapping module 510 uses the global tone mapping curve received from the global mapping determination module 506 to determine globally tone-mapped pixel values for the pixel values of the current line.

The operation performed by the global mapping module 510 may be described by the equation:

$$GM_{i,j} = T[L_{i,j}] \quad (1)$$

where $L_{i,j}$ is the input luminance value at pixel position i,j in the image, T is the global mapping function (i.e. the global mapping curve determined by the global mapping determination module 506) and $GM_{i,j}$ is the resulting globally tone-mapped pixel value at the pixel position i,j. In the example shown in FIG. 5, the rest of the processing in the processing module 508 is performed using the globally mapped pixel values output from the global mapping module 510.

In other examples, the global tone mapping might be performed on the received pixel values separately to the local tone mapping, such that the rest of the processing in the processing module 508 is performed using the received pixel values (without global mapping having been performed on them). In these other examples, the global tone mapping is run in parallel to the local tone mapping (instead of before the local tone mapping) and the results of the separate global and local tone mapping are subsequently combined. That is, both the global and local tone mapping use the received pixel values as their inputs instead of the local tone mapping module 512 using the results of the global tone mapping from the global mapping module 510. In further examples, global tone mapping might not be performed on the received pixel values at all, in which case the local tone mapping is applied directly to the received pixel values and the results of the local tone mapping are combined with the received pixel values to arrive at final tone-mapped pixel values. However, experiments have shown that better results can be achieved by combining both local and global tone mapping.

In the examples described herein in detail, the image block comprises a plurality of columns of pixel values, e.g. 16 columns of pixel values, and a piece of rolling information (e.g. a rolling histogram or a rolling tone mapping curve) is determined for each column, as described below. However, in other examples, the image block might not be divided into multiple columns, and the rolling information may then relate to pixel values covering the whole width of the image block.

The globally tone mapped pixel values are passed to the local mapping module 512. In step S606, for each column, the local mapping module 512 determines a histogram representing the distribution of pixel values in the current line. The range possible pixel values (e.g. 0 to 255 where eight bits are used for the pixel values) is split into M bins, and the pixel values of the current line are assigned to the appropriate bin of the appropriate histogram to thereby determine the values of the histograms.

Figure 7:
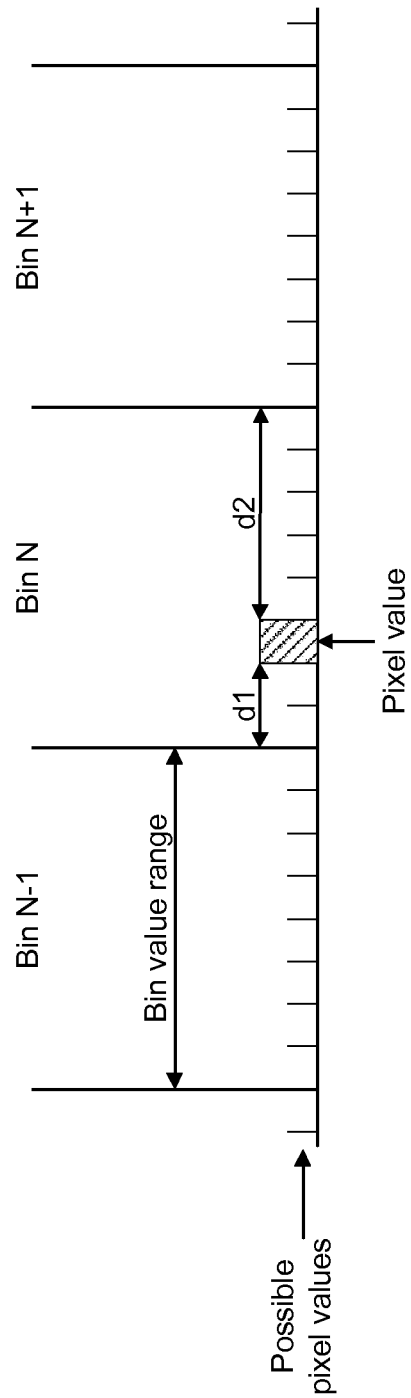
FIG. 7 shows bins of a histogram spanning a range of pixel values.

The number of bins, M, in the each of the histograms may be different in different examples, and for example, may be a power of 2 in order to simplify calculations which use the histograms. FIG. 7 shows an example in which each bin includes eight of the possible pixel values, and three bins (Bin N−1, Bin N and Bin N+1) are shown in FIG. 7. A pixel value of the current line is shown to lie within Bin N. It is noted that abrupt changes in mapping curves due to large differences between adjacent bins of a histogram can result in undesired effects in the tone-mapped pixel values. Therefore, in order to avoid such undesired effects, it may be useful to smooth the histograms before they are used to determine tone mapping curves (as described below). One way to smooth the histograms is to determine the histograms such that each pixel value of the current line contributes to a plurality of the bins of a histogram. So, for each pixel value, the local mapping module 512 determines which of the M bins of the histogram, corresponds to the pixel value and then calculates a contribution to the selected bin and to the two adjacent bins of the histogram. For example, the pixel value that is shown in FIG. 7 will provide a contribution to Bin N−1, Bin N and Bin N+1 in the appropriate histogram for the column in which the pixel value is present. The pixel value contributes to the three different bins in a weighted manner according to the position of the pixel value in the range of possible pixel values. For example, 50% of the pixel contribution may be assigned to bin N, where the pixel value lies, while the remaining 50% is distributed between the two adjacent bins (Bin N−1 and Bin N+1) in accordance with the distances (denoted d1 and d2 in FIG. 7) of the pixel value to the two adjacent bins. For example, the contribution to Bin N−1 may be given by $$\left(1 - \frac{d1}{d1+d2}\right)50\%,$$

which in the example shown in FIG. 7 is 5/14; and the contribution to Bin N+1 may be given by $$\left(1 - \frac{d2}{d1+d2}\right)50\%,$$

which in the example shown in FIG. 7 is 2/14. As described above the contribution of the pixel value to Bin N is ½.

When all of the contributions to the histograms of the pixels values from the current line have been considered, the histograms may be normalized in order to simplify the subsequent operations which use the histograms. Each histogram is normalized so that the values in the histogram sum to one. The normalization of the histograms can be carried out during the histogram calculation, by adjusting the contribution of each pixel to the histogram bins according to the total number of pixels counted, or afterwards, by dividing each histogram bin by the summation of all of the values in the histogram.

In step S608, the local mapping module 512 flattens one or more of the histograms. The histograms are flattened in order to avoid excessive correction for image areas which have constant (or almost constant) pixel values, e.g. representing large areas of similarly coloured pixels in the image. Image areas which have constant (or almost constant) pixel values will have a high concentration of pixel values in just a few bins of the histogram. A flattening factor, $w_F$, may be applied to the histogram values in order to flatten the histograms. The flattening factor, $w_F$, may be determined for a histogram relating to a particular column such that it depends upon the extent to which the pixel values of the current line vary within the particular column. For example, the flattening factor, $w_F$, could be calculated as the summation of values in a histogram which are above a certain threshold, $Th_F$, according to the equation:

$$w_F = \frac{\sum_{i=1}^{M} \max(0, tH(i) - Th_f)}{(1 - Th_f)} \quad (2)$$

where M is the number of bins in the histogram and tH(i) is the value of the histogram in the ith bin. The threshold, $Th_F$, may be set to different values in different examples, and may be fixed or variable in different examples. For example, where the histograms are normalized, the threshold could be set at 0.25. The result is a value for $w_F$ in the range $0 \leq w_F \leq 1$, where a higher value of $w_F$ indicates that a greater amount of flattening will be applied. For evenly spread pixel values over the range of possible pixel values, it is likely that none of the bins of the histogram will have a value over the threshold, $Th_F$, in which case the flattening factor $w_F$ will be determined to be zero. In this case a default flattening will be applied to the histogram as described below. However, if the pixel values are concentrated into a few of the histogram bins then it is more likely that the bin values will exceed the threshold, $Th_F$, in which case the flattening factor $w_F$ will be determined to be non-zero, and will cause some flattening to be applied to the histogram. In other words, the more concentrated the pixel values are in histogram bins, the larger the flattening factor, $w_F$, will be determined to be.

The flattening factor, $w_F$, for each of the columns is used to apply the flattening to the M bins of the respective histogram for the column, where the value in the ith bin of the histogram for column c is denoted $tH_c(i)$, to thereby determine a flattened histogram, $H_c$, for the current line and for the column. The ith bin of the flattened histogram, $H_c(i)$, may be determined according to the equation:

$$H_c(i) = \left(\frac{1}{M} - tH_c(i)\right) \cdot \max(w_F, dw_f) + tH_c(i) \quad (3)$$

where $dw_F$ represents the default flattening of the histogram. If the flattening factor $w_F$ which is determined as described above is very small, then we may want to apply more flattening to the histogram than would be applied simply by using the flattening factor $w_F$. Therefore, in these cases we use the default flattening factor $dw_F$ rather than the flattening factor $w_F$. This helps to limit the amount of local contrast enhancement which is applied which otherwise may cause detrimental effects in the final image. The default flattening factor $dw_F$ can be set to different values in different examples, and is typically low (e.g. in the range $0 \leq dw_F \leq 0.1$), such that it is only used when the flattening factor $w_F$ becomes very low, i.e. lower than the default flattening factor $dw_F$, because this is when the local contrast enhancement may cause detrimental effects in the final image.

At this point each column in the image has an associated histogram (which may be smoothed and flattened) calculated to be used for the calculation and update of each column's tone mapping curve.

In step S610 the local mapping module 512 determines a tone mapping curve for each of the columns using the respective histogram for the column, e.g. by integrating the respective histogram for the column. When the tone mapping curves are determined by integrating the respective histograms, the tone mapping curves are monotonically increasing curves. Integrating the histograms is just one example of how the tone mapping curves may be determined using the histograms. The tone mapping curves may be considered to be transfer functions since they define a relationship between the input pixel values and the tone-mapped pixel values. The tone mapping curve for a column, c, derived from the pixel values of the current line is denoted as $tT_c$, and has M values corresponding to an integration of the M bins of the respective histogram. That is, the first value of the tone mapping curve, $tT_c(1)=0$. Then for subsequent values of the tone mapping curve:

$$tT_c(n)=tT_c(n-1)+H_c(n-1) \quad (4)$$

for $2 \leq n \leq M$, where M is the number of bins in the histogram. The integration described here is a very simple method of determining the tone mapping curve $tT_c$ for column c using the histogram $H_c$ for the column, which is beneficial when the tone mapping unit 406 is implemented within a camera processing pipeline 404 as described above because the tone mapping unit 406 processes the pixel values in real-time as they are received to reduce delays in the camera processing pipeline 404. In other examples (e.g. when the tone mapping unit is not implemented in a system where the pixel values need to be processed in real-time as part of a camera processing pipeline), more complex methods of determining the tone mapping curve $tT_c$ for column c using the histogram $H_c$ for the column may be used, as appropriate.

The values of the tone-mapping curve $tT_c$ which has been determined according to equation 4 above will be in the range from 0 to 1 because the histograms $H_c$ were normalized. The tone-mapping curve may then be scaled in order to determine a scaled tone-mapping curve $tT'_c$ which matches the range of possible output luminance values according to the equation:

$$tT'_c=tT_c \cdot (OMaxL-OMinL) \quad (5)$$

where OMinL and OMaxL correspond to the minimum and maximum output luminance levels respectively. For example, OMinL may equal 0 and OMaxL may equal 255. In the step of mapping the pixel values to tone-mapped pixel values (described below at step S616) the result is shifted by adding OMinL so that the range of the tone-mapped pixel values will be between OMinL and OMaxL.

The tone mapping curve $tT'_c$ is the curve determined based on the pixel values of the current line for column c. However, it would be useful for mapping the input pixel values to tone-mapped pixel values to have a tone mapping curve which takes into account pixel values of previous lines. Therefore, a rolling tone mapping curve for column, $T_c$, is updated for each new line of pixel values (i.e. on each iteration of the method) based on the tone mapping curve $tT'_c$ determined for the current line and column and the rolling tone mapping curve determined in the previous iteration. Therefore, in step S612 the local mapping module 512 retrieves the rolling tone mapping curves for the columns which have been determined in previous iterations (i.e. based on previous lines). The rolling tone mapping curves may be stored in the store 514 between iterations of the method, so the step of retrieving the rolling tone mapping curves may comprise retrieving them from the store 514.

In step S614, on the kth iteration (i.e. for the kth line of pixel values), the local mapping module 512 determines the rolling tone mapping curve $T_c(k)$ by performing a weighted combination of the tone mapping curve determined for the current line $tT'_c$ and the rolling tone mapping curve determined in the previous iteration $T_c(k-1)$, e.g. according to the equation:

$$T_c(k)=T_c(k-1) \cdot (1-w_T)+tT'_c \cdot w_T \quad (6)$$

where $w_T$ is an update weighting factor which is in the range $0 \leq w_T \leq 1$, and which can be set differently in different examples to control the contribution of the current line to the rolling tone mapping curves. Setting $w_T$ can control how 'reactive' the rolling tone mapping curve is to the current line of pixel values. The value of $w_T$ will usually be the same for each of the columns. The update weighting factor will control the extent to which pixel values from previous lines will affect the tone mapping applied to the pixel values of the current line. A larger value of $w_T$ means that the current line contributes more to the rolling tone mapping curve $T_c$, and the contribution of previous lines will drop off by a factor of $(1-w_T)$ for each previous line. As can be appreciated the rolling tone mapping curve is used so that information relating to pixel values of previous lines can be used for applying local tone mapping to the current line, without needing to store the pixel values of the previous lines in the tone mapping unit 406. In the example described above in relation to FIGS. 2 and 3, the local tone mapping takes account of a square sub-block of pixel values from the image. Therefore, as an example, the value of $w_T$ may be set such that an approximately square region of pixel values are taken into account by using the rolling tone mapping curve. Therefore, the value of $w_T$ may depend upon the width of the columns. As we look back further to previous lines of pixel values, the contribution of the pixel values to the rolling tone mapping curve for the current line reduces. It may be considered that if the contribution of a previous line to the current rolling tone mapping curve $T_c$ is less than 1% of the contribution of the current line to the current rolling tone mapping curve $T_c$ then that previous line does not substantially contribute to the current rolling tone mapping curve $T_c$. In this way we can determine an effective height of a region which substantially contributes to the current rolling tone mapping curve $T_c$, as being those lines whose contribution to the current rolling tone mapping curve is $\geq 1\%$ of the contribution of the current lines to the current rolling tone mapping curve.

Figure 8B:
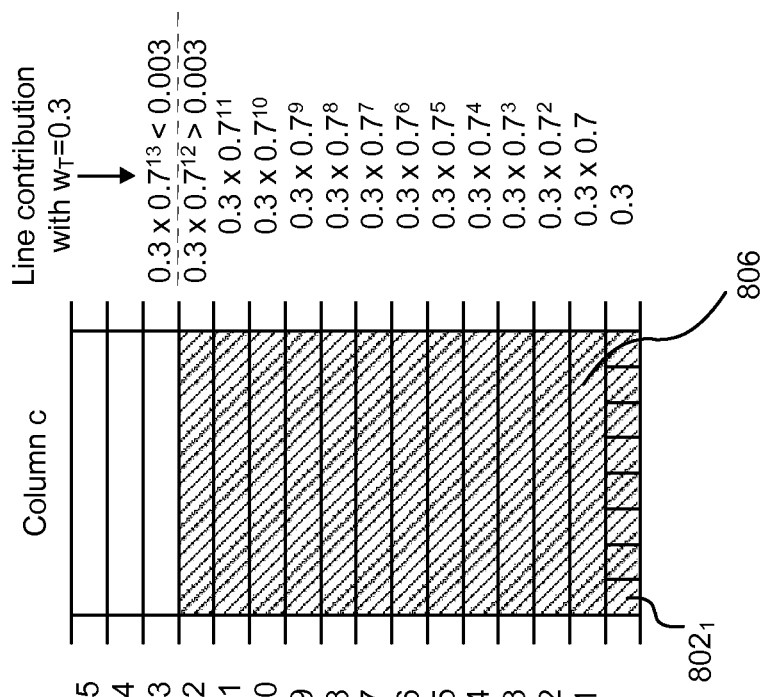
FIGS. 8a and 8b represent lines of pixels in a particular column in two examples.
Figure 8A:
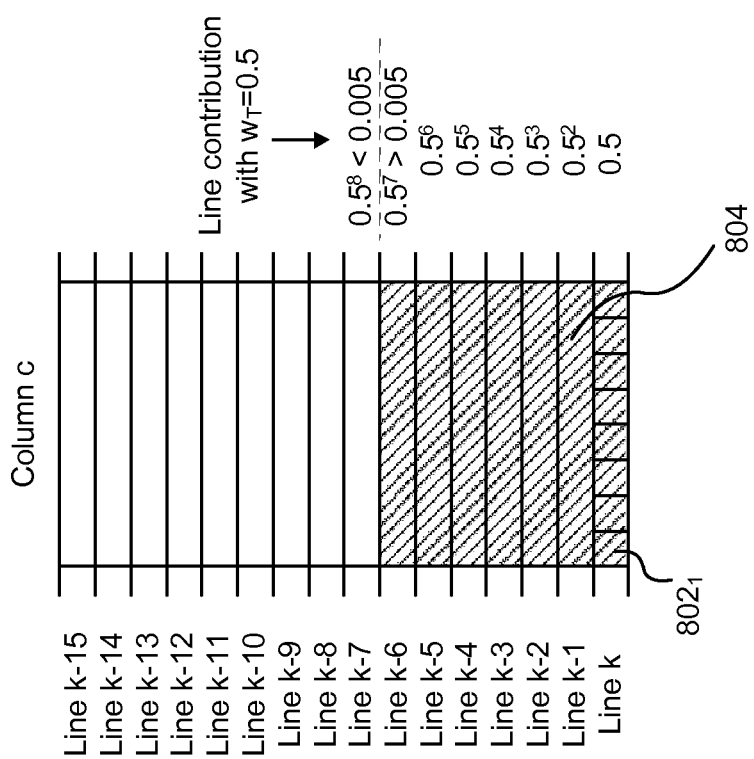

FIG. 8a shows a column of pixel values, whereby there are eight pixels (the first of which is denoted $802_1$ in FIG. 8a) in a line of the column. That is, the width of the column is 8 pixels. In the example shown in FIG. 8a, $w_T=0.5$. The current line is shown as "Line k" in FIG. 8a. According to equation 6, the contribution of the pixel values of Line k to the rolling tone mapping curve for line k, $T_c(k)$, is 0.5. For a line that is a number of lines, x, before the current line, i.e. for Line k−x, the contribution of the pixel values of Line k−x to the rolling tone mapping curve for line k, $T_c(k)$, is $0.5^{x+1}$. Therefore lines k−1 to k−6 have contributions which are more than 1% of the contribution of line k, but line k−7 and all lines before line k−7 have contributions which are less than 1% of the contribution of line k. Therefore it can be considered that the hashed region 804 of pixel values (i.e. 7 lines of pixel values) substantially contribute to the rolling tone mapping curve for line k, $T_c(k)$. Therefore $w_T=0.5$ may be a good choice for an 8-pixel wide column because the region 804 is approximately square.

FIG. 8b shows the effect of reducing $w_T$ to 0.3. According to equation 6, the contribution of the pixel values of Line k to the rolling tone mapping curve for line k, $T_c(k)$, is 0.3. For a line that is a number of lines, x, before the current line, i.e. for Line k−x, the contribution of the pixel values of Line k−x to the rolling tone mapping curve for line k, $T_c(k)$, is $0.3 \times 0.7^x$. Therefore lines k−1 to k−12 have contributions which are more than 1% of the contribution of line k, but line k−13 and all lines before line k−13 have contributions which are less than 1% of the contribution of line k. Therefore it can be considered that the hashed region 806 of pixel values (i.e. 13 lines of pixel values) substantially contribute to the rolling tone mapping curve for line k, $T_c(k)$. Therefore $w_T=0.3$ might be considered to be too small for an 8-pixel wide column because the region 806 is longer than it is wide. Choosing $w_T=0.3$ may be better suited for use with columns which are wider than 8 pixels. It should be noted that in some other examples it might not be the aim to make the regions 804 or 806 approximately square. In these other examples, long and thin or short and wide regions may be used by setting the value of $w_T$ accordingly.

Figure 9:
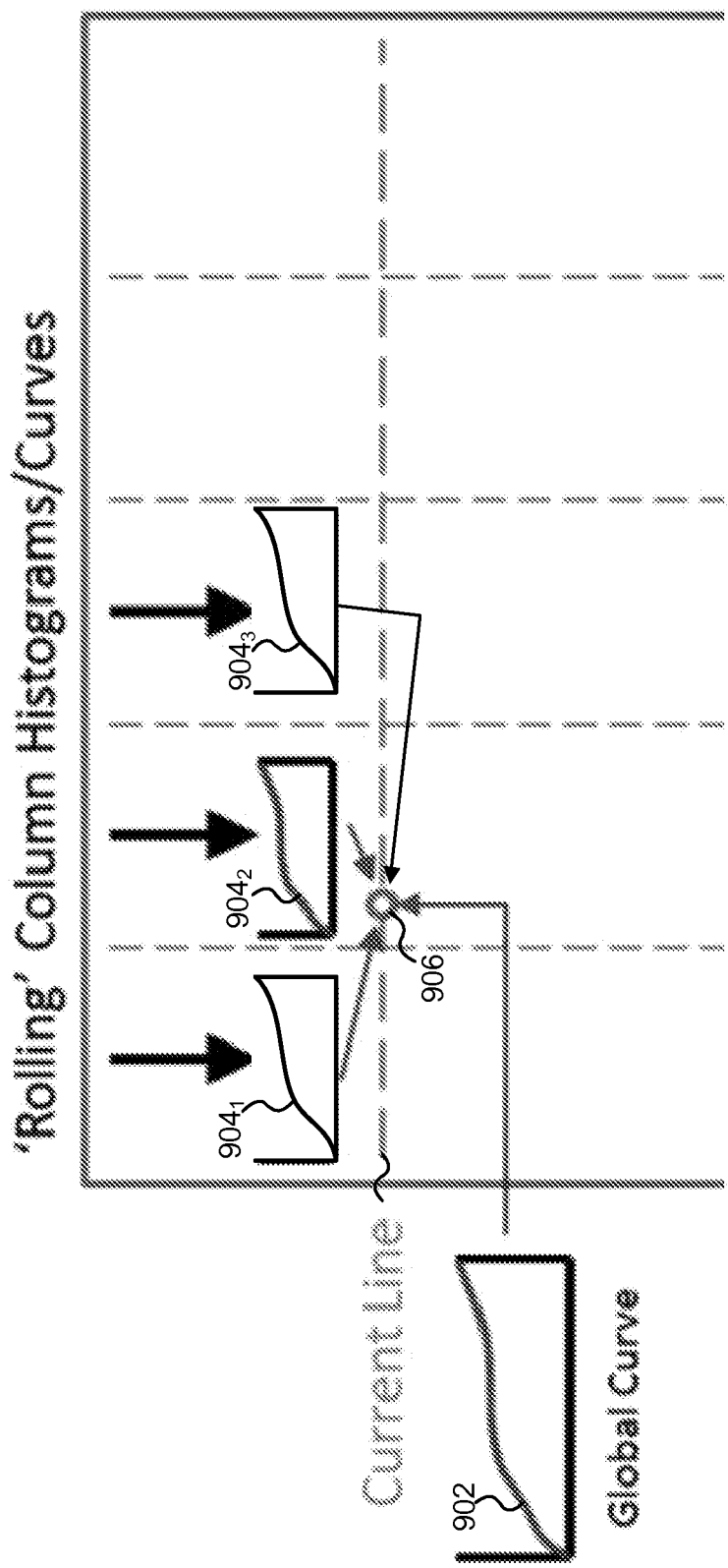
FIG. 9 represents applying tone mapping curves from different columns to determine a tone-mapped pixel value.

Following step S614 the rolling tone mapping curves for the columns of the current line have been determined. Then in step S616 the local mapping module 512 maps the pixel values of the current line to tone-mapped pixel values using the determined tone mapping curves. As an example which is represented in FIG. 9, for each pixel value of the current line (e.g. for pixel 906), more than one of the rolling tone mapping curves determined in step S614 for the different columns (e.g. the rolling tone mapping curves $904_1$, $904_2$ and $904_3$) and the global tone mapping curve 902 received from the global mapping determination module 506 are used to determine a tone-mapped pixel value. The mapping of the pixel values to tone-mapped pixel values is explained below with reference to FIGS. 10 and 11a to 11c.

In order to obtain a smooth transition between columns, for each pixel value of the current line, a plurality of candidate tone-mapped pixel values are determined using a respective plurality of the local tone mapping relationships (e.g. $904_1$, $904_2$ and $904_3$). The different candidate tone-mapped pixel values for a particular pixel at position (i,j) may then be interpolated in order to arrive at a locally tone-mapped pixel value, referred to herein as $LM_{i,j}$. The interpolation is performed such that the distance of the pixel's position to the different columns affects the influence that the candidate tone-mapped pixel values determined using the tone mapping curves for the different columns will have on the locally tone-mapped pixel value, $LM_{i,j}$.

Figure 10:
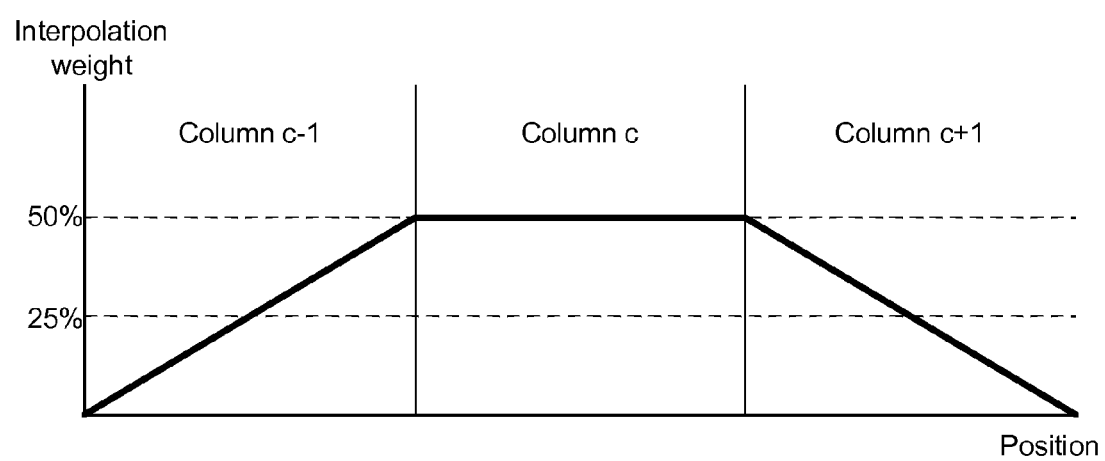
FIG. 10 shows a weighting that is applied to a tone mapping curve when determining a tone-mapped pixel value using the tone mapping curve.

For example, FIG. 10 shows the influence (or "interpolation weight") that the candidate pixel value determined using the tone mapping curve for column c will have on $LM_{i,j}$, as a function of the pixel's position. As shown in FIG. 10, for pixels that lie in column c, the candidate tone-mapped pixel value determined using the tone mapping curve for column c will have an influence of 50% on $LM_{i,j}$. However, the remaining 50% is distributed between the two adjacent columns (i.e. column c−1 and column c+1), as shown in FIG. 10.

Figure 11A:
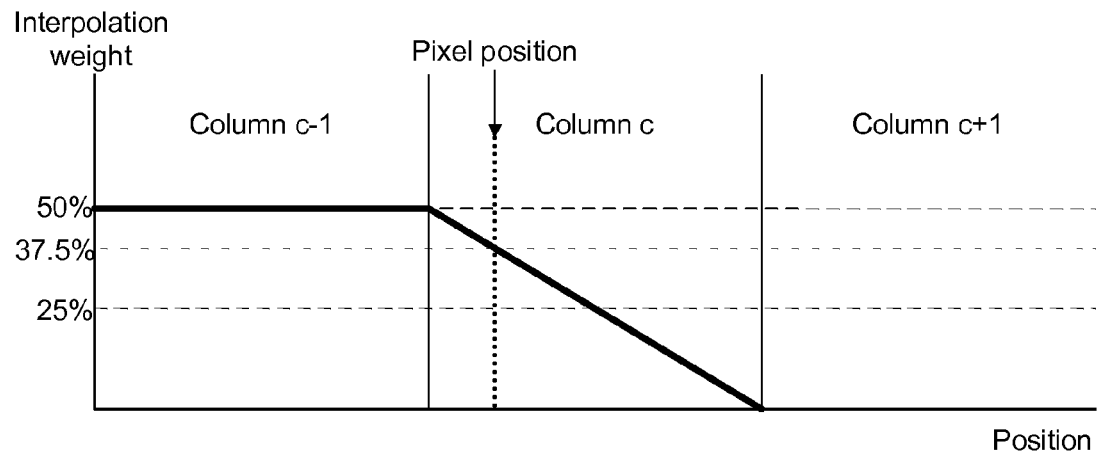
FIGS. 11a to 11c represent weightings applied to three tone mapping curves when determining a tone-mapped pixel value using the three tone mapping curves.
Figure 11B:
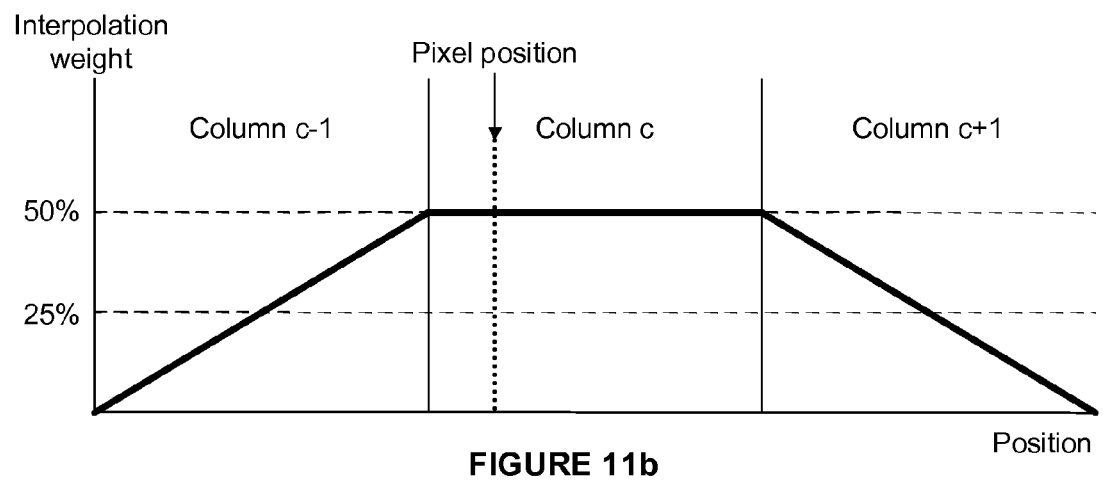
Figure 11C:
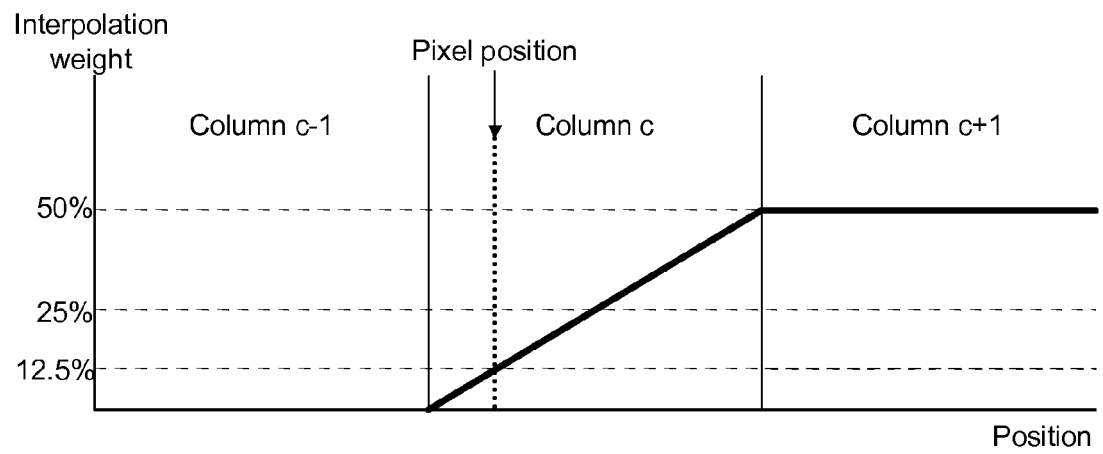

FIGS. 11a to 11c show how the interpolation weights are calculated for a given pixel position in column c as indicated by the dotted lines in FIGS. 11a to 11c. FIG. 11a shows the interpolation weight used for the candidate tone-mapped pixel value determined using the tone mapping curve for column c−1, which at the indicated pixel position is 37.5%. FIG. 11b shows the interpolation weight used for the candidate tone-mapped pixel value determined using the tone mapping curve for column c, which at the indicated pixel position is 50% because the pixel position lies within column c. FIG. 11c shows the interpolation weight used for the candidate tone-mapped pixel value determined using the tone mapping curve for column c+1, which at the indicated pixel position is 12.5%. The interpolation weights of the different columns depend only on the pixel position and can be precomputed for the different pixel positions. It is noted that the interpolation is one-dimensional interpolation in this example, whereas in the system represented by FIG. 3 the interpolation is two-dimensional interpolation. One dimensional interpolation is simpler to implement than two dimensional interpolation, and is therefore quicker and uses less processing power to implement.

In summary of the above, the locally tone-mapped pixel value, $LM_{i,j}$, for a pixel at position (i,j) (i.e. in row i and column j) is calculated based on the globally tone-mapped pixel value, $GM_{i,j}$ (determined by the global mapping module 510) and is an interpolation of multiple candidate tone-mapped pixel values determined based on the tone mapping curves, T, of respective columns, such that the locally tone-mapped pixel value, $LM_{i,j}$, is given by the equation:

$$LM_{i,j} = T_{c-1}[GM_{i,j}] \cdot w_{c-1} + T_c[GM_{i,j}] \cdot w_c + T_{c+1}[GM_{i,j}] \cdot w_{c+1} \quad (7)$$

where $w_{c-1}$ is the interpolation weight for column c−1 (e.g. 37.5% in the example shown in FIG. 11a), $w_c$ is the interpolation weight for column c (e.g. 50% in the example shown in FIG. 11b), and $w_{c+1}$ is the interpolation weight for column c+1 (e.g. 12.5% in the example shown in FIG. 11c).

The final tone-mapped pixel values determined for the current line may be determined by performing a weighted combination of the locally tone-mapped pixel values LM, and the globally tone-mapped pixel values GM. For example, the final tone-mapped pixel value (denoted $M_{i,j}$) for the pixel at position (i,j) may be determined as a weighted combination of the globally tone-mapped pixel value $GM_{i,j}$ and the locally tone mapped pixel value $LM_{i,j}$ according to the equation:

$$M_{i,j} = OMinL + GM_{i,j} \cdot (1-w_{LM}) + LM_{i,j} \cdot w_{LM} \quad (8)$$

where $w_{Lm}$ is a weighting factor which corresponds to the amount of contribution assigned to the local tone mapping. $w_{Lm}$ is a configurable parameter. Both the local and global tone mapping values, $LM_{i,j}$ and $GM_{i,j}$, are within the range from 0 to (OMaxL−OMinL), so the addition of OMinL in equation 8 positions the final tone-mapped pixel value, $M_{i,j}$, to be within the range from OMinL to OMaxL. In the example shown in FIG. 5, the weighted combination of the globally tone-mapped pixel value $GM_{i,j}$ and the locally tone mapped pixel value $LM_{i,j}$ is performed, according to equation 8, by the combination of the multipliers 516 and 518 and the adder 520. That is, the multiplier 516 multiplies the locally tone mapped pixel value $LM_{i,j}$ by $w_{Lm}$, the multiplier 518 multiplies the globally tone-mapped pixel value $GM_{i,j}$ by $(1-w_{L,m})$ and then the adder 520 adds the outputs from the multipliers 516 and 518 to OMinL to thereby determine the final tone-mapped pixel value, $M_{i,j}$.

In step S618 the updated rolling tone-mapping curves $T_c(k)$ for the current line (line k) are stored in the store 514. The previously stored rolling tone mapping curves $T_c(k-1)$ are no longer needed and can be removed or overwritten from the store 514 when the updated rolling tone-mapping curves $T_c(k)$ for the current line (line k) are stored in the store 514. The updated rolling tone-mapping curves can be retrieved from the store in a subsequent iteration of the method for use in processing the pixel values of a subsequent line.

After step S618 the method passes back to step S602 and repeats for the next iteration, i.e. for the next line of pixel values. The method keeps iterating until all of the lines of the block have been processed.

In the examples described above, tone mapping curves are used to represent the relationship between the input pixel values and the tone-mapped pixel values. In other examples, this relationship may be represented by something other than a curve, e.g. a look up table.

Furthermore, in the examples described above, the retrieved rolling tone mapping curves are updated based on the pixel values of the current line and then the tone mapping is applied to the pixel values using the updated rolling tone mapping curves. However, it would be possible to apply the tone mapping using the retrieved rolling tone mapping curves (which are based on previous lines of pixel values)

and then update the rolling tone mapping curves. This would not provide as accurate tone mapping (although the difference is very small) because the pixel values of the current line would not be taken into account in the local tone mapping (only pixel values of previous lines would be taken into account), but this is still one possible option which provides acceptable results and may be simpler to implement.

In the examples described in detail above, the rolling tone mapping curves are the information that is stored and retrieved in each iteration to allow the processing of the current line to take account of the pixel values of the previous lines without having to store the actual pixel values of the previous lines in the tone mapping unit 406. In other examples, it may be the histograms of the columns which are the information that is stored and retrieved in each iteration to allow the processing of the current line to take account of the pixel values of the previous lines. In that case, in each iteration the histograms would be retrieved and may be updated based on the pixel values of the current line before being used to determine tone mapping curves as described above for use in applying the tone mapping to the pixel values of the current line. There is not much difference in terms of the ease of implementation between using rolling tone mapping curves as described above (such that it is the tone mapping curves which are stored and retrieved between iterations of the method) and using rolling histograms (such that it is the histograms which are stored and retrieved between iterations of the method). In both of these examples, rolling information relating to pixel values of previous lines can be retrieved and used in a current iteration to determine tone mapping curves for use in mapping the pixel values of the current line to tone-mapped pixel values. The rolling information is updated based on the pixel values of the current line and stored such that it can be used in a subsequent iteration to process a subsequent line of pixel values. In this way, the tone mapping unit 406 can process lines of pixel values in real time, as they are received, without needing to store the pixel values for use in processing subsequent lines.

In the examples described above, a line of pixel values is processed on each iteration. However, the camera processing pipeline 404 may be capable of processing multiple lines of pixel values in parallel. Therefore, it may be useful for the tone mapping unit 406 to be able to process a block of lines in parallel in each iteration. Therefore, in other examples, a block of more than one line may be processed by the tone mapping unit 406 in each iteration. That is, in each of a plurality of iterations, a subset of two or more lines of pixel values of the block are received and processed in parallel to thereby map the received pixel values of the subset of lines to tone-mapped pixel values. In this case, at the end of a current iteration, a temporary histogram is determined based on the pixel values of all of the lines in the subset of lines (i.e. the line block) that are processed in the current iteration, which can be used on the subsequent iteration to determine suitable tone mapping curves for the subsequent line block.

Figure 12:
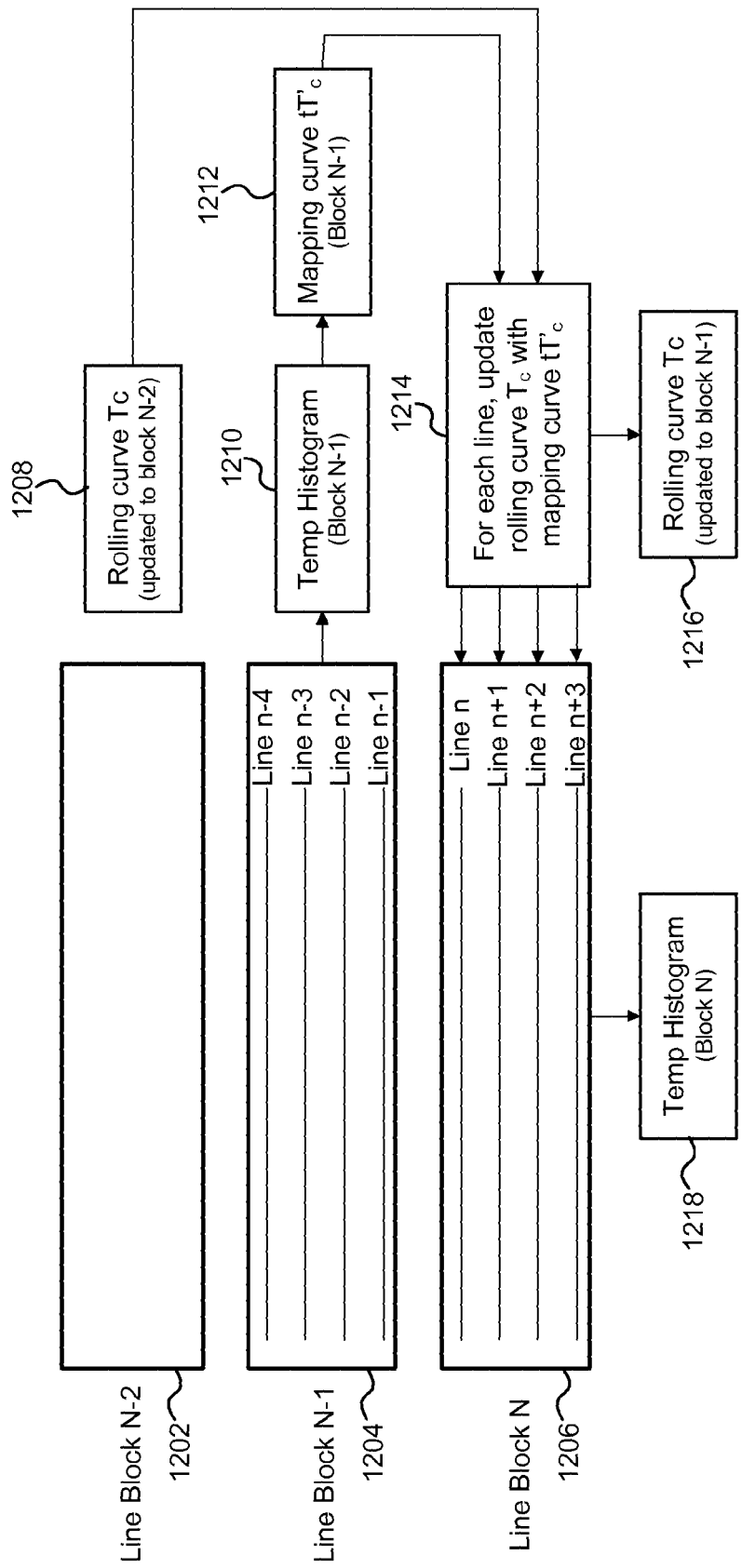
FIG. 12 represents parallel processing of multiple lines in each iteration.

For example, as shown in FIG. 12, on each iteration, a line block comprising four lines of pixel values may be processed in parallel. FIG. 12 shows line block N−2 1202 which has been processed two iterations before a current iteration (N). FIG. 12 also shows line block N−1 1204 which has been processed one iteration before a current iteration (N), wherein line block N−1 includes lines n−4, n−3, n−2 and n−1. FIG. 12 also shows the current line block N 1206 which includes lines n, n+1, n+2 and n+3 which are to be processed in the current iteration. At the end of the previous iteration, a rolling tone mapping curve $T_c$ 1208 which takes account of the pixel values of all of the lines up to and including the lines in line block N−2 has been determined and stored in the store 514. Furthermore, a temporary histogram 1210 representing the distribution of the pixel values in line block N−1 has been determined by the end of the previous iteration. On the current iteration, the pixel values of the lines n, n+1, n+2 and n+3 in a current line block 1204 are processed, in parallel, to determine tone-mapped pixel values for these lines. The temporary histogram 1210 is retrieved and a mapping curve 1212 is determined based on the temporary histogram 1210 which was determined from the pixel values in the line block N−1. After the mapping curve 1212 has been determined the temporary histogram is reset (i.e. cleared) so that a temporary histogram 1218 can be determined to represent the distribution of the pixel values of the current line block 1206.

In block 1214, the rolling curve 1208 is updated using the mapping curve $tT''_c$ 1212 that was determined from the pixel values of the line block N−1. The rolling curve 1208 is updated in a corresponding manner to that described above in relation to equation 6, i.e.:

$$T_c(\text{block } N-1) = T_c(\text{block } N-2) \cdot (1 - w_T) + tT'_c \cdot w_T$$

where $w_T$ is an update weighting factor which is in the range $0 \leq w_T \leq 1$. In some examples a single update of the rolling curve is performed in the current iteration and then the updated rolling curve is used to apply the tone mapping to the pixel values in each of the lines in the current line block 1206. This is a simple way to implement the update of the rolling tone mapping curve, but it may create sudden changes in the rolling tone mapping curve that is used for applying tone mapping to the lines of pixels in the block 1206. That is, the tone mapping curve applied to the pixel values of line n−1 would not take account of the pixel values in the lines n−2, n−3 or n−4, and then suddenly the tone mapping curve applied to the pixel values of line n would fully take account of all of the pixel values in the lines n−4 to n−1. A sudden change in the tone mapping curve used between line n−1 and line n might give rise to perceptually detrimental effects in the tone mapped image. Therefore, it may be better to gradually update the tone mapping curve over the lines of the current line block 1206, from line n to line n+3. The aim is to distribute the influence of the statistics gathered from block N−1 so that there is a smooth change in the rolling tone mapping curve applied to each line within block N. Since tone mapping is applied to all of the lines of the current line block 1206 in parallel, the gradual change in the rolling tone mapping curve is "gradual" in the sense of changing over the lines n to n+3, rather than changing over time. This may be achieved by applying a different update weighting factor $w_T$ to the rolling tone mapping curve for use with the respective lines of the current line block 1206. For the last line in the current line block 1206, the update weighting factor $w_T$ is set to fully update the rolling tone mapping curve $T_c$ up to the end of the line block N−1. This fully updated rolling tone mapping curve $T_c$ is denoted 1216 in FIG. 12 and is stored for use in a subsequent iteration. For the lines before line n+3 in the current line block 1206 the update weighting factor $w_T$ is reduced compared to that used for line n+3, such that the rolling tone mapping curve is gradually updated to a greater extent with the mapping curve 1212 over the lines in the current line block 1206 from line n to line n+3.

In an example, for each line of the current line block 1206, the following steps are performed in the current iteration:

the temporary histogram is updated with data from the line such that the temporary histogram includes data representing the distribution of pixel values in the line;

the rolling tone mapping curve $T_c$ is updated as described above with the tone mapping curve $tT'_c$ using an appropriate update weighting factor $w_T$ for the line; and the updated tone mapping curve is applied to the pixel values of the line as described above.

It is noted that the pixel values of the lines in the current line block 1206 are not used to update the tone mapping curve before the tone mapping curve is used to apply tone mapping to the pixel values of the current line block 1206. As described above, this provides acceptable results and in this case is simpler to implement than updating the tone mapping curves with the pixel values of the line of the current line block 1206 before applying the tone mapping curve to the pixel values of the current line block 1206.

As described above, the rolling tone mapping curve $T_c$ is updated based on the tone mapping curve 1212 determined using the pixel values of the previous block (block N−1), i.e. up to the line n−1. Therefore, there is a difference in how 'recent' the mapping curve information is which is used for applying tone mapping to the pixel values of the different lines in the current line block 1206. For example, line n has information which is updated using information from the previous line of pixel values (line n−1). In contrast, line n+3 has information which is updated using information from four lines previous (line n−1). This may cause problems. The gradual change in the rolling tone mapping curves described above (by using different update weighting factors for the different lines in the current line block 1206) helps to reduce detrimental effects that this might have, but it may still cause problems and the greater the number of lines in the line blocks, the greater these problems may be. However, experiments have been carried out to assure that the effects of processing multiple lines together in parallel are acceptable. It has been determined that using line blocks which comprise four lines of pixel values may be acceptable. There is a trade-off between: (i) the benefit from increasing the speed with which the lines of pixel values are processed (by processing them in parallel), and (ii) the drawback of a slight inaccuracy in the tone mapping curves used for processing some of the lines. When the tone mapping unit 406 is implemented in a camera processing pipeline 404 in which pixel data is processed in real-time the trade-off may lean towards processing multiple lines of pixel values (e.g. four lines of pixel values as shown in FIG. 12) in parallel. However, if the tone mapping unit 406 is not implemented in a camera processing pipeline such that the pixel data does not need to be processed in real-time then the trade-off may lean towards processing the lines sequentially, i.e. one at a time as opposed to in parallel.

Tone mapping is applied to the lines of the current line block 1206 in the current iteration in parallel, and at the end of the current iteration the rolling tone mapping curve 1216 is updated up to the end of line block 1204, and the temporary histogram (denoted 1218 in FIG. 12) represents the distribution of the pixel values in the lines of the current line block 1206. These pieces of information are stored for use in the next iteration to apply tone mapping to the lines of the next line block (i.e. a line block including lines n+4 to n+7).

There has been described above the processing of the luminance processing module 502 which determines tone-mapped luminance values from the input luminance values. Changes to the luminance values due to the tone-mapping may cause changes in the appearance of the corresponding chrominance values. Therefore, it is useful to correct the chrominance values in accordance with the tone-mapping that has been applied to the luminance values. With reference to the flow chart shown in FIG. 13, there is now described the processing of the chrominance processing module 504 which determines corrected chrominance values based on the input chrominance values in accordance with the tone-mapping that has been applied to the input luminance values by the luminance processing module 502.

The chrominance correction is carried out by the chrominance processing module 504 after the tone-mapped luminance values have been determined by the luminance processing module 502. In step S1302 the input luminance values and the input chrominance values are received at the chrominance processing module 504 from the input to the tone mapping unit 406. Furthermore, in step S1302 the tone-mapped luminance values are received at the chrominance processing module 504 from the luminance processing module 502.

In step S1304 candidate corrected chrominance values are determined for the pixels based on the input chrominance values, the input luminance values and the tone-mapped luminance values. The candidate corrected chrominance values are determined to preserve the original colour saturation of each pixel regardless of the changes in the luminance level resulting from the tone-mapping. There are two chrominance values for a pixel (e.g. Cb and Cr) and the same correction is applied to both chrominance values. As such we only describe the correction being applied to an input chrominance value, $ChromaIN_{i,j}$ for a pixel at position (i,j) but it is to be understood that $ChromaIN_i$ could represent either of the two input chrominance values.

The input luminance value and the tone mapped luminance value for a pixel at position (i,j) are denoted $L_{i,j}$ and $M_{i,j}$ respectively herein. In the example described herein, the luminance values are normalized so both $L_{i,j}$ and $M_{i,j}$ are within the same range. Furthermore, the input chrominance values are displaced so the neutral chromaticity value corresponds to zero. It is noted that since the neutral chromaticity value corresponds to zero, some of the chrominance values will be negative.

The first step in the calculation is to compute the input pixel saturation, $SatIN_{i,j}$, as $$SatIN_{i,j} = \frac{ChromaIN_{i,j} + c}{L_{i,j} + c} \quad (9)$$

which approximately represents the ratio between the input chrominance value and the input luminance value for a pixel. The c term is an arbitrarily small value so it does not substantially affect the saturation calculated according to equation 9 while avoiding numerical instabilities when the denominator value, $L_{i,j}$, approaches zero.

A second saturation, $cSat_{i,j}$, is determined which describes the relationship between the tone-mapped luminance value and the candidate corrected chrominance value, such that the candidate corrected chrominance value, $Cand\_ChromaOUT_{i,j}$, for the pixel at position (i,j) is given by:

$$Cand\_ChromaOUT_{i,j} = cSat_{i,j} \cdot M_{i,j}. \quad (10)$$

The second saturation, $cSat_{i,j}$, has a predetermined relationship with the first saturation, $SatIN_{i,j}$, defined by a saturation scaling factor, $w_s$, such that:

$$cSat_{i,j} = w_s \cdot SatIN_{i,j}. \quad (11)$$

The saturation scaling factor, $w_s$, can be controlled (i.e. adapted) to control the saturation correction in case it may be desirable to increase or decrease the saturation correction. The saturation scaling factor may be equal to 1 such that $cSat_{i,j}=SatIN_{i,j}$. In other examples the saturation scaling factor might not equal 1 such that $cSat_{i,j} \#SatIN_{i,j}$.

For pixels which have mid-range input luminance values (i.e. not in the proximity of the maximum value or the minimum value of the range of available luminance values), the candidate corrected chrominance values Cand_ChromaOUT$_{i,j}$ may provide good chrominance correction and may be used as the corrected chrominance values output from the chrominance processing module 504. However, it is possible that residual chrominance values present in pixels with very high or very low luminance values become noticeable (undesirably so) if the tone mapping applied by the luminance processing module 502 significantly changes the associated luminance values and the chrominance values are scaled in accordance with the changes to the luminance values. Therefore, the chrominance processing method includes mechanisms to limit potential 'error' situations caused by excessive modification of the chrominance values when large changes in the luminance values occur.

That is, in step S1306 confidence weightings, conf$_{i,j}$, are determined for the pixels in dependence on the input luminance values, $L_{i,j}$, of the respective pixels. The confidence weightings indicate confidences in the respective candidate corrected chrominance values, Cand_ChromaOUT$_{i,j}$. The confidence weightings, conf$_{i,j}$, are determined such that if the input luminance value of a pixel, $L_{i,j}$, is in the proximity of a maximum value or a minimum value of a range of available luminance values, then the confidence weighting for the pixel, conf$_{i,j}$, is lower than if the input luminance value for the pixel, $L_{i,j}$, is not in the proximity of the maximum value or the minimum value of the range of available luminance values.

For example, the confidence weighting, conf$_{i,j}$, for a pixel at position (i,j) may be given by:

$$\text{conf}_{i,j} = \min(1, \omega_c \cdot (1 - 2 \cdot |0.5 - nL_{i,j}|)) \quad (12)$$

where $nL_{i,j}$ is the input luminance value of the pixel at position (i,j) normalized to be in the range from 0 to 1, and where $\omega_c$ is a confidence scaling factor.

The confidence weighting, conf$_{i,j}$, takes a value in the range from 0 and 1, and tends to 0 for very low or very high input luminance values, and tends to 1 for mid-range input luminance values. The confidence scaling factor, $w_c$, is configurable such that the confidence in the candidate corrected chrominance values can be configured differently in different examples. The 'min' function in equation 12 means that the value of conf$_{i,j}$ may be clipped so that it does not exceed 1.

Figure 14A:
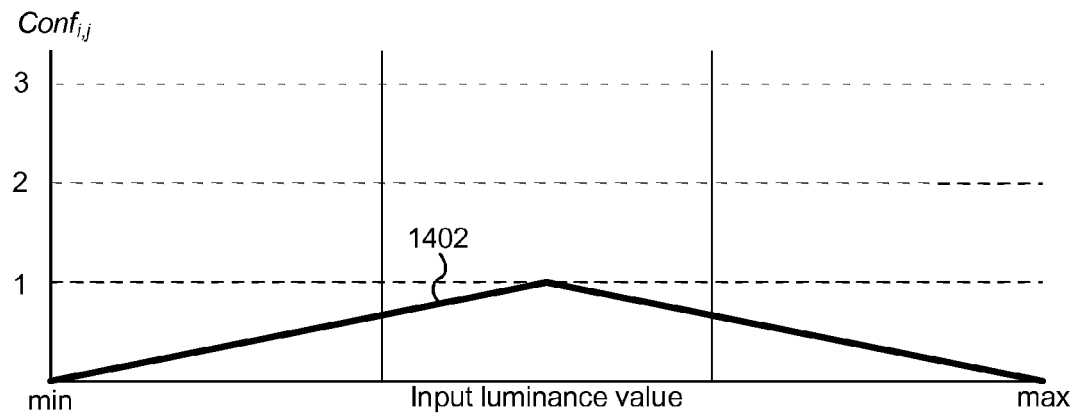
FIG. 14a shows a graph representing a confidence weighting of a candidate corrected chrominance value as a function of the input luminance value in a first example.

FIG. 14a shows a line 1402 representing the value of conf$_{i,j}$ as a function of the input luminance value $L_{i,j}$ that is obtained with the confidence scaling factor $w_c=1$. In this example, conf$_{i,j}$ reaches a maximum value of 1 when $nL_{i,j}=0.5$, that is for a luminance value in the middle of the possible range which corresponds with the highest confidence in the candidate corrected chrominance value Cand_ChromaOUT$_{i,j}$.

Figure 14B:
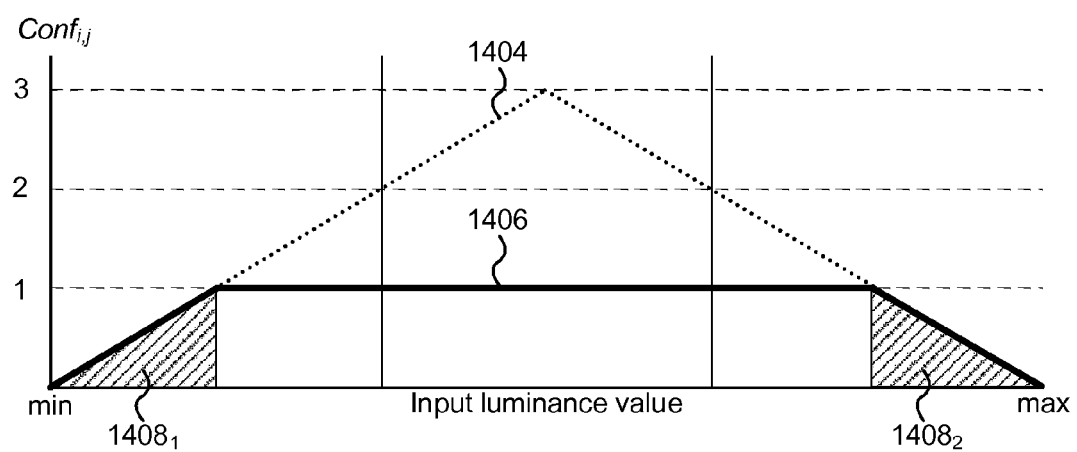
FIG. 14b shows a graph representing a confidence weighting of a candidate corrected chrominance value as a function of the input luminance value in a second example.

FIG. 14b shows a line 1406 representing the value of conf$_{i,j}$ as a function of the input luminance value $L_{i,j}$ that is obtained with the confidence scaling factor $w_c=3$. FIG. 14b also shows a dotted line 1404 which represents the value that conf$_{i,j}$ would have if it was not clipped at 1. The clipping makes the line 1406 a trapezoid with a large range of input luminance values corresponding to the maximum possible confidence weighting (conf$_{i,j}=1$), and narrower regions (shown as hashed regions 1408$_1$ and 1408$_2$ in FIG. 14b) in the proximity of the maximum and minimum input luminance values where the confidence weighting falls below 1 and approaches zero.

In step S1308 the determined confidence weightings, conf$_{i,j}$, are used to perform, for the respective pixels, a weighted combination of the respective candidate corrected chrominance value, Cand_ChromaOUT$_{i,j}$, and the respective input chrominance value, ChromaIN$_{i,j}$, thereby determining corrected chrominance values, ChromaOUT$_{i,j}$, for the pixels which can be output from the chrominance processing module 504.

The confidence weightings, conf$_{i,j}$, are used for both weighting how much the input chrominance values are corrected and to scale down the saturation of the pixels if the normalized input luminance values are very close to 0 or 1. The corrected chrominance value, ChromaOUT$_{i,j}$, for the pixel at position (i,j) may be calculated according to the equation:

$$\text{ChromaOUT}_{i,j} = \text{Cand\_ChromaOUT}_{i,j} \cdot \text{conf}_{i,j} + \text{ChromaIN}_{i,j} \cdot (1 - \text{conf}_{i,j}). \quad (13)$$

It is noted that the ranges of the input and output chrominance values may be different (due to different bit depths) and may be signed or unsigned. Therefore the previously described operations may be carried out in the examples described herein taking into account the following considerations:

For the calculation of the first saturation, SatIN$_{i,j}$, signed input luminance values are used, and the input chrominance values are centred on zero (i.e. neutral chromaticity=0). Therefore the obtained saturation, SatIN$_{i,j}$, will be signed accordingly.

Differences between the ranges of $L_{i,j}$ and $M_{i,j}$ may be taken into consideration when calculating the corrected chrominance values, ChromaOUT$_{i,j}$. For example, the $L_{i,j}$ value may be scaled to match the range of the $M_{i,j}$.

The corrected chrominance values, ChromaOUT$_{i,j}$, may be scaled such that they have an appropriate bit depth and sign.

The tone-mapped luminance values output from the luminance processing module 502 and the corrected chrominance values output from the chrominance processing module 504 are output from the tone mapping unit 406 and may be used in any suitable manner thereafter, e.g. in further processing modules of the camera processing pipeline 404.

Figure 13:
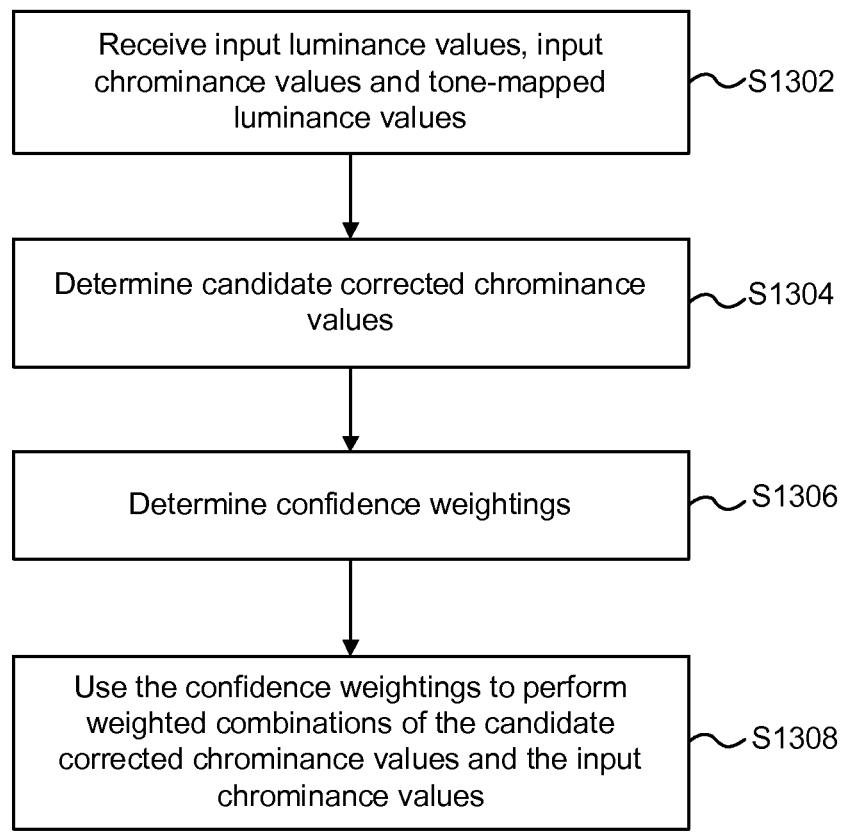
FIG. 13 is a flow chart for a method of applying correction to input chrominance values.

The method steps shown in FIGS. 6 and 13 could be implemented in hardware modules or software modules or a combination thereof at the tone mapping unit 406.

In the examples described above, the pixel data is received from an image sensor 402 and relates to pixels of an image captured by the image sensor 402. In other examples, the lines of pixels may be from other blocks of pixels. For example, the pixel data may relate pixels of any type of image, which may be received from an image sensor (as in the examples described above), or received from a graphics processing unit (GPU) or from a memory. The pixel data may relate to an image captured by an image sensor (as in the examples described above), or the pixel data may relate to a computer-generated image which may for example have been generated by a GPU. In other words, the tone mapping unit 406 may be implemented as appropriate wherever tone mapping of pixels from a block of pixels is to be implemented.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component, unit or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, unit, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of correcting input chrominance values of pixels to determine corrected chrominance values for the pixels based on tone-mapped luminance values which have been determined by applying tone mapping to input luminance values of the pixels, the method comprising:
  determining candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value;
  determining confidence weightings which indicate confidences in the respective candidate corrected chrominance values, wherein the confidence weightings are determined in dependence on the input luminance values of the respective pixels; and
  using the determined confidence weightings to compute, for each of the pixels, a weighted combination of the respective candidate corrected chrominance value and the respective input chrominance value, thereby determining the corrected chrominance values for the pixels.

2. The method of claim 1 wherein the confidence weightings are determined such that if the input luminance value of a pixel is in the proximity of a maximum value or a minimum value of a range of available luminance values, then the confidence weighting for the pixel is lower than if the input luminance value for the pixel is not in the proximity of the maximum value or the minimum value of the range of available luminance values.

3. The method of claim 2 wherein a confidence weighting $\text{conf}_{i,j}$ for a pixel at position (i,j) is given by:

$$\text{conf}_{i,j} = \min(1, \omega_c \cdot (1 - 2 \cdot |0.5 - nL_{i,j}|))$$

where $nL_{i,j}$ is the input luminance value of the pixel at position (i,j) normalized to be in the range from 0 to 1, and where $\omega_c$ is a confidence scaling factor.

4. The method of claim 1 wherein the predetermined relationship is such that the first saturation equals the second saturation.

5. The method of claim 1 wherein the predetermined relationship is such that the second saturation is given by a saturation scaling factor multiplied by the first saturation.

6. A chrominance processing module configured to correct input chrominance values of pixels to determine corrected chrominance values for the pixels based on tone-mapped luminance values which have been determined by applying tone mapping to input luminance values of the pixels, the chrominance processing module comprising circuitry configured to:
   determine candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value;
   determine confidence weightings in dependence on the input luminance values of the respective pixels, the confidence weightings indicating confidences in the respective candidate corrected chrominance values; and
   use the determined confidence weightings to perform, for each of the pixels, a weighted combination of the respective candidate corrected chrominance value and the respective input chrominance value, to thereby determine the corrected chrominance values for the pixels.

7. The chrominance processing module of claim 6 wherein the chrominance processing module is configured to determine the confidence weightings such that if the input luminance value of a pixel is in the proximity of a maximum value or a minimum value of a range of available luminance values, then the confidence weighting for the pixel is lower than if the input luminance value for the pixel is not in the proximity of the maximum value or the minimum value of the range of available luminance values.

8. The chrominance processing module of claim 7 wherein the chrominance processing module is configured to determine the confidence weighting, $conf_{i,j}$, for a pixel at position (i,j) according to the equation:

$$conf_{i,j} = \min(1, \omega_c \cdot (1 - 2 \cdot |0.5 - nL_{i,j}|))$$

where $nL_{i,j}$ is the input luminance value of the pixel at position (i,j) normalized to be in the range from 0 to 1, and where $\omega_c$ is a confidence scaling factor.

9. The chrominance processing module of claim 6 wherein the predetermined relationship is such that the first saturation equals the second saturation.

10. The chrominance processing module of claim 6 wherein the predetermined relationship is such that the second saturation is given by a saturation scaling factor multiplied by the first saturation.

11. The chrominance processing module of claim 6 wherein the chrominance processing module is implemented as part of a tone mapping unit which comprises a luminance processing module configured to determine the tone-mapped luminance values by applying tone mapping to input luminance values of the pixels, and wherein the chrominance processing module is configured to receive the tone-mapped luminance values from the luminance processing module.

12. A non-transitory computer readable storage medium having stored thereon computer executable code that when executed on a processor causes the processor to correct input chrominance values of pixels to determine corrected chrominance values for the pixels based on tone-mapped luminance values which have been determined by applying tone mapping to input luminance values of the pixels, the code causing the processor to:
   determine candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value;
   determine confidence weightings which indicate confidences in the respective candidate corrected chrominance values, wherein the confidence weightings are determined in dependence on the input luminance values of the respective pixels; and
   use the determined confidence weightings to perform, for each of the pixels, a weighted combination of the respective candidate corrected chrominance value and the respective input chrominance value, thereby determining the corrected chrominance values for the pixels.

13. A non-transitory computer readable storage medium having stored thereon computer executable code that when executed on a processor causes the processor to generate a chrominance processing module configured to correct input chrominance values of pixels to determine corrected chrominance values for the pixels based on tone-mapped luminance values which have been determined by applying tone mapping to input luminance values of the pixels, the chrominance processing module being configured to:
   determine candidate corrected chrominance values for the pixels based on the input chrominance values, the input luminance values and the tone-mapped luminance values, such that for each of the pixels, a first saturation determined from the input luminance value and the input chrominance value has a predetermined relationship to a second saturation determined from the tone-mapped luminance value and the candidate corrected chrominance value;
   determine confidence weightings in dependence on the input luminance values of the respective pixels, the confidence weightings indicating confidences in the respective candidate corrected chrominance values; and
   use the determined confidence weightings to perform, for each of the pixels, a weighted combination of the respective candidate corrected chrominance value and the respective input chrominance value, to thereby determine the corrected chrominance values for the pixels.

* * * * *